United States Patent
Kulyakhtin et al.

(10) Patent No.: US 11,492,897 B2
(45) Date of Patent: Nov. 8, 2022

(54) TARGETED TRACER INJECTION WITH ONLINE SENSOR

(71) Applicant: RESMAN AS, Trondheim (NO)

(72) Inventors: Anton Kulyakhtin, Trondheim (NO); Christian Andresen, Vikhammer (NO); Thomas Sperle, Jakobsli (NO)

(73) Assignee: RESMAN AS, Trondheim (NO)

(*) Notice: Subject to any disclaimer, the term of this patent is extended or adjusted under 35 U.S.C. 154(b) by 610 days.

(21) Appl. No.: 16/483,359

(22) PCT Filed: Feb. 3, 2017

(86) PCT No.: PCT/NO2017/050032
§ 371 (c)(1),
(2) Date: Aug. 2, 2019

(87) PCT Pub. No.: WO2018/143814
PCT Pub. Date: Aug. 9, 2018

(65) Prior Publication Data
US 2020/0032641 A1    Jan. 30, 2020

(51) Int. Cl.
*E21B 47/11*    (2012.01)
*E21B 43/14*    (2006.01)
(Continued)

(52) U.S. Cl.
CPC .............. *E21B 47/11* (2020.05); *E21B 43/14* (2013.01); *G01F 1/7086* (2013.01); *G01F 1/74* (2013.01); *G01N 21/64* (2013.01)

(58) Field of Classification Search
CPC ........ E21B 43/14; E21B 47/11; G01F 1/7086; G01F 1/74
See application file for complete search history.

(56) References Cited

U.S. PATENT DOCUMENTS

| | | | | |
|---|---|---|---|---|
| 5,044,436 A | * | 9/1991 | Magnani ................. | E21B 47/11 166/272.3 |
| 5,047,632 A | * | 9/1991 | Hunt ....................... | E21B 27/02 250/303 |

(Continued)

FOREIGN PATENT DOCUMENTS

| | | |
|---|---|---|
| EP | 0400707 A2 | 12/1990 |
| EP | 2075403 A1 | 7/2009 |

(Continued)

OTHER PUBLICATIONS

International Preliminary Report on Patentability, with a completion date of Jul. 2, 2019, for International Application No. PCT/NO2017/050032.

(Continued)

*Primary Examiner* — John Fitzgerald
(74) *Attorney, Agent, or Firm* — Birch, Stewart, Kolasch & Birch, LLP

(57) ABSTRACT

A method, a system, tools for use by the system, and an interpretation method for injecting and detecting tracers and conducting flow characterizing of a petroleum well are disclosed. The method describes monitoring of travel time and slip velocity between two/three different phases (oil/water and possibly gas) in the well. The travel time and slip velocity are determined using an injection too for injection of an over pressurized injection of the partitioning tracers each of which would follow certain phase. The tracers are detected by an optical detection probe in the pipe. The slip velocity is obtained from the difference of travel time of two tracers which partition to two different phases.

26 Claims, 19 Drawing Sheets

(51) Int. Cl.
*G01F 1/7086* (2022.01)
*G01F 1/74* (2006.01)
*G01N 21/64* (2006.01)

(56) References Cited

U.S. PATENT DOCUMENTS

| | | | | |
|---|---|---|---|---|
| 5,306,911 A * | 4/1994 | Hunt | ...... | E21B 27/02 |
| | | | | 250/269.4 |
| 5,552,598 A * | 9/1996 | Kessler | ...... | G01N 33/2823 |
| | | | | 250/269.3 |
| 6,633,236 B2 * | 10/2003 | Vinegar | ...... | E21B 43/14 |
| | | | | 340/854.3 |
| 6,840,316 B2 | 1/2005 | Stegmeier et al. | | |
| 6,981,553 B2 * | 1/2006 | Stegemeier | ...... | E21B 34/066 |
| | | | | 166/305.1 |
| 7,469,597 B2 * | 12/2008 | Flaten | ...... | G01F 22/00 |
| | | | | 73/861.04 |
| 10,669,839 B2 * | 6/2020 | Nyhavn | ...... | E21B 47/11 |
| 10,865,637 B2 * | 12/2020 | Kulyakhtin | ...... | E21B 47/11 |
| 10,871,067 B2 * | 12/2020 | Nyhavn | ...... | E21B 47/11 |
| 2003/0056952 A1 * | 3/2003 | Stegemeier | ...... | E21B 47/11 |
| | | | | 166/250.12 |
| 2004/0060703 A1 * | 4/2004 | Stegemeier | ...... | E21B 47/13 |
| | | | | 166/310 |
| 2007/0068242 A1 | 3/2007 | Difoggio | | |
| 2008/0092666 A1 * | 4/2008 | Flaten | ...... | G01F 22/00 |
| | | | | 73/861.07 |
| 2013/0245948 A1 * | 9/2013 | Nyhavn | ...... | E21B 27/02 |
| | | | | 702/6 |
| 2014/0343908 A1 * | 11/2014 | Nyhavn | ...... | E21B 43/00 |
| | | | | 703/2 |
| 2019/0203587 A1 * | 7/2019 | Kulyakhtin | ...... | E21B 47/11 |
| 2020/0116011 A1 * | 4/2020 | Grubb | ...... | E21B 47/07 |
| 2021/0332695 A1 * | 10/2021 | Shaw | ...... | E21B 49/08 |

FOREIGN PATENT DOCUMENTS

| | | |
|---|---|---|
| GB | 2337106 A | 11/1999 |
| WO | WO 01/65053 A1 | 9/2001 |
| WO | WO 02/098199 A2 | 12/2002 |
| WO | WO 2006/068488 A1 | 6/2006 |
| WO | WO 2011/109721 A1 | 9/2011 |
| WO | WO 2012/057634 A1 | 5/2012 |
| WO | WO 2015/105474 A2 | 7/2015 |
| WO | WO 2016/105210 A2 | 6/2016 |

OTHER PUBLICATIONS

Written Opinion of the International Searching Authority and International Search Report, dated Aug. 2, 2017, for International Application No. PCT/NO2017/050032.

* cited by examiner

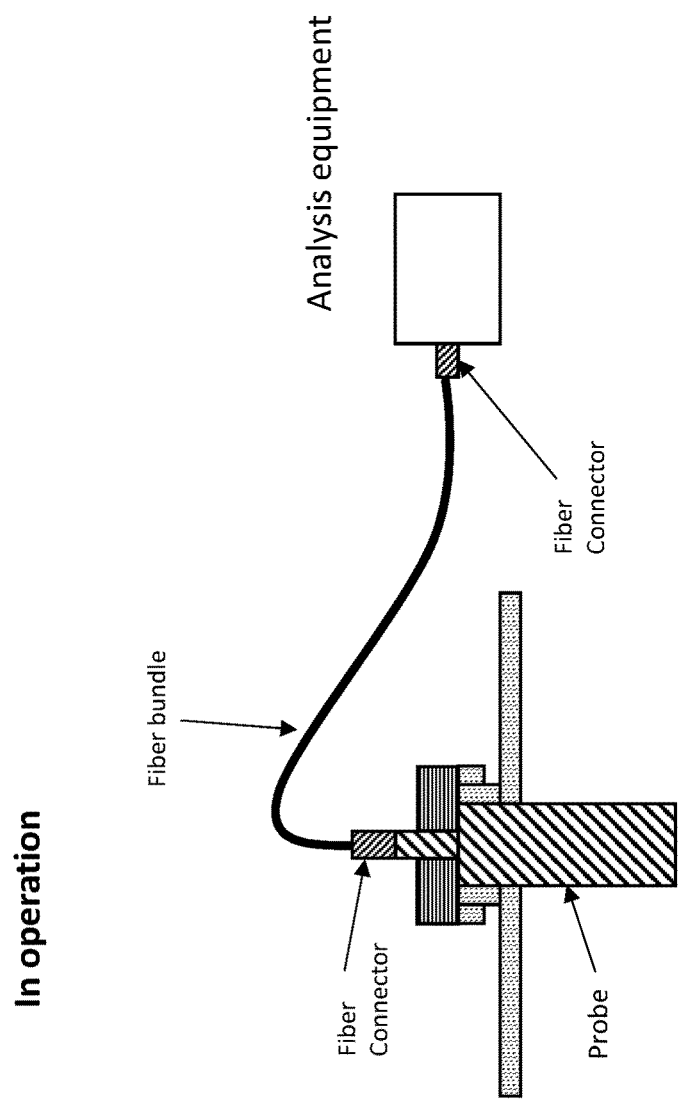
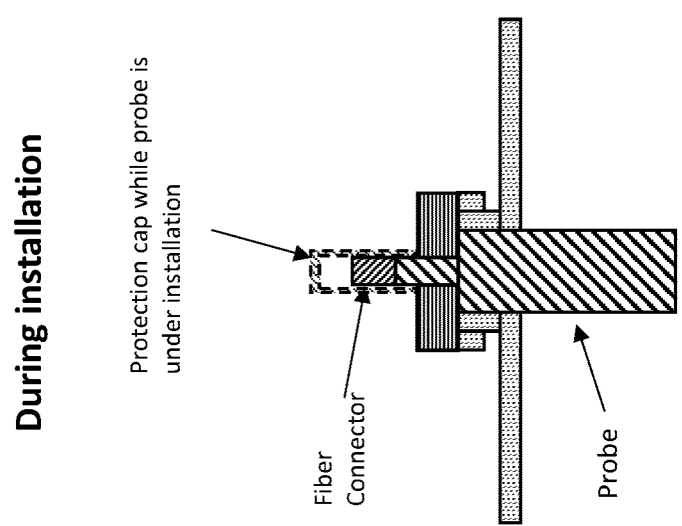
Fig. 6b
Fig. 6c

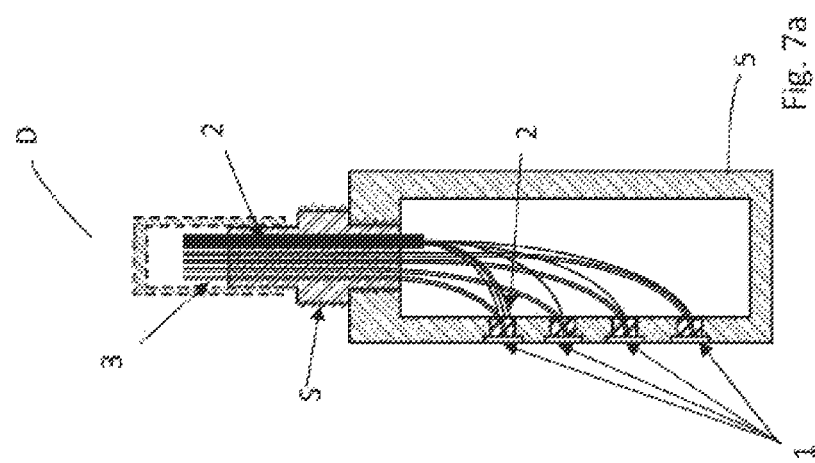
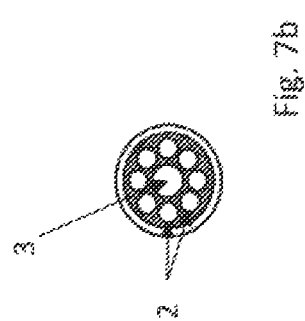

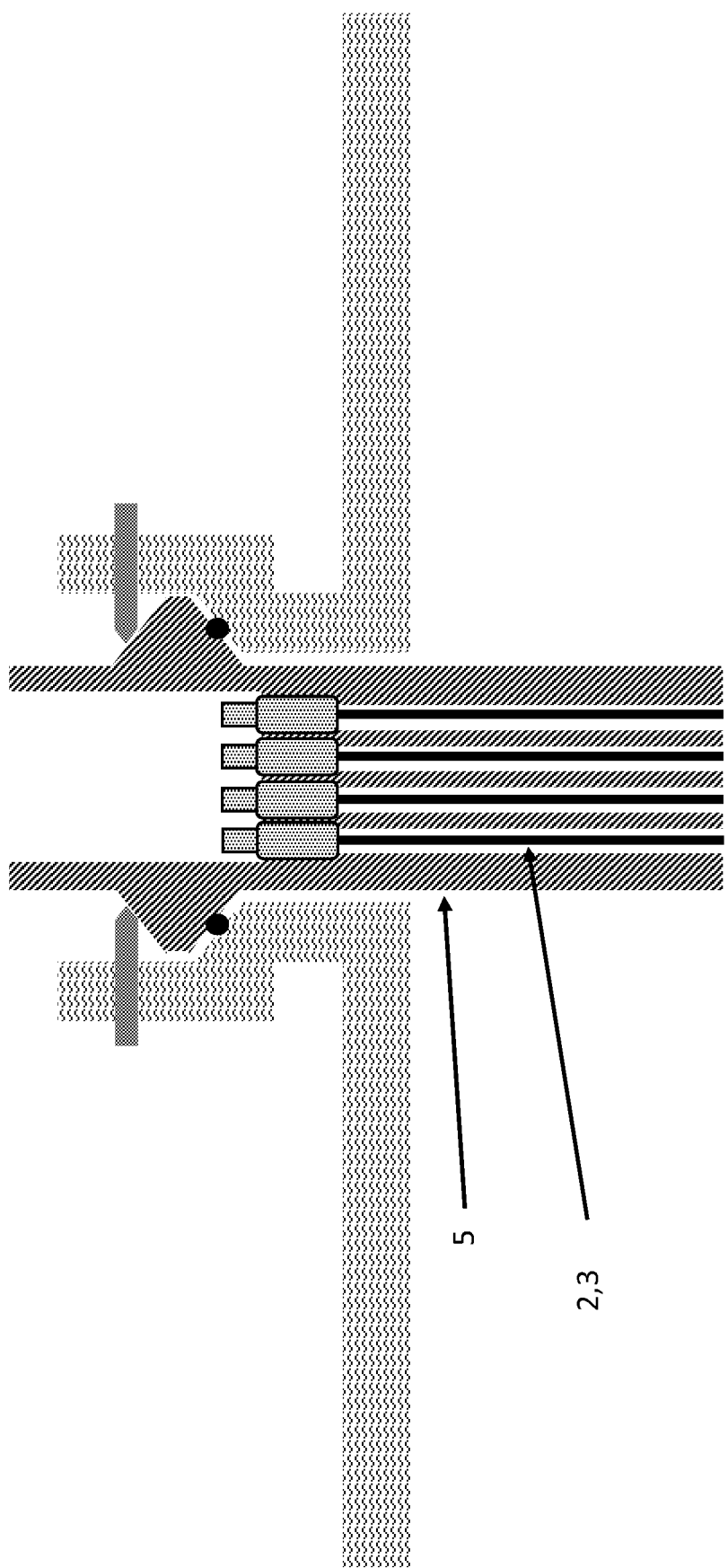

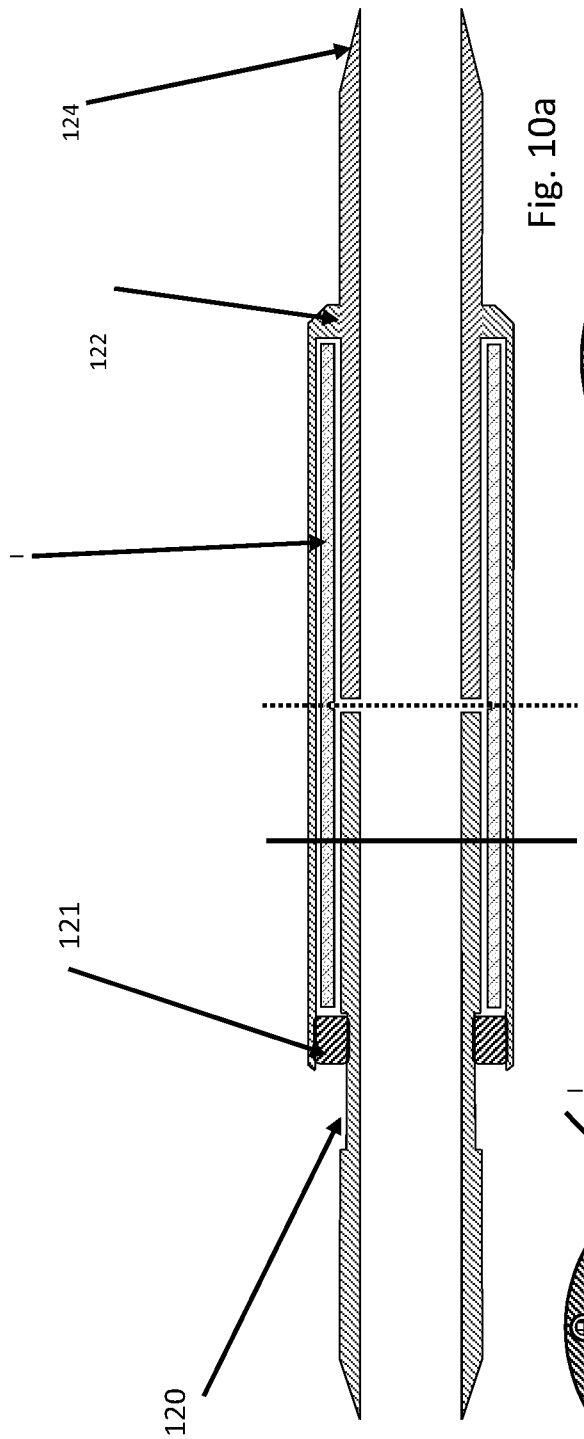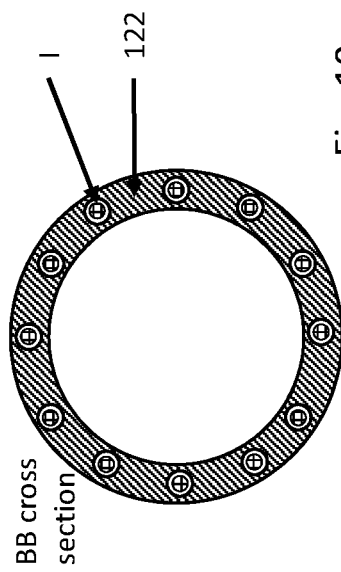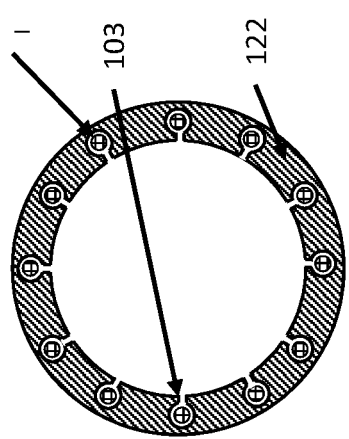

TARGETED TRACER INJECTION WITH ONLINE SENSOR

FIELD OF THE INVENTION

The invention relates to a method and a system and apparatus for injecting and detecting tracers and conducting flow characterizing of a petroleum well.

BACKGROUND ART

U.S. Pat. No. 6,840,316 Stegemeler describes a tracer injection system for use in a well, with a current impedance device being generally configured for positioning about a portion of a piping structure of the well and for impeding a time-varying electrical signal conveyed along the portion of the piping structure; and
a downhole, electrically controllable, tracer injection device adapted to be electrically connected to the piping structure adapted to be powered by the time varying electrical signal, and adapted to expel a tracer material into the well.

SHORT SUMMARY OF THE INVENTION

A main object of the present invention is to disclose a method, a system, tools for use by the system, and an interpretation method for injecting and detecting tracers and conducting flow characterizing of a petroleum well.

More specific the invention is a method of multi-phase petroleum well flow characterization comprising at least two injection positions, along the well, the well having a local production flow of target fluids water and hydrocarbon fluids at each position, whereof at least one or more zonal positions are along the production zone; and
a) for at least two of the positions,
   using locally arranged injection devices,
   injecting in a synchronized manner, at least one set of at least a water-affine and a hydrocarbon-affine tracer, the hydrocarbon affine tracers will have affinity to oil, gas or both oil and gas,
   the tracers being optically detectable,
   the injection occurring simultaneously into all the target fluids present in the local production flow. A simultaneously injection into all the target fluids present in the local production flow means that the tracers will be injected into, and through, all phases in the flow simultaneously, quickly, and vigorously for the tracers to automatically mix into its target fluids.
Then, step (b) allowing transport of the production flow from the downhole injection points to an online detector in the production flow at a detection point downstream of all the injection points. A detection point may be located downhole, but preferably being positioned at the surface.
Next, (c) at the online detection point, conducting optical monitoring for detection of the tracers in the production flow to determine arrival times of the tracers,
(d) calculating detection point slip times between corresponding arrival times of water- and hydrocarbon tracers as measured at the detection point,
(e) back calculating detection point slip times to transport and local zonal slip times,
(f) based on the transport and local zonal slip times, characterize the flow behaviour of the well and determine the inflow distribution of each phase along the wellbore.

The invention is also a detection probe arrangement to use with the method in the system. More specific the invention is an optical inline tracer detection probe for a multi-phase petroleum well inflow characterization system in a production pipe with a production flow
comprising
one or more of inspection windows/lenses along at least a first sensor body arranged across one or more of potentially present fluid phases in the production flow,
a light source for generating light capable of generating luminescent light in the tracers
one or more optical fibres through the sensor body for guiding the light to and through the windows into the flow,
one or more optical fibres through the sensor body for receiving backscattered luminescence arriving "back" through the window and guiding the light to a luminescence detector arranged for calculating light intensity values of light representing the tracers arranged for registering the light intensity values.

The invention is also a tracer injector arrangement to use with the method in the system. More specific the invention is a tracer injection device, for the multi-phase petroleum well flow characterization system in a production pipe with a production flow comprises, at least one reservoir for at least a water-affine or a hydrocarbon-affine tracer, the hydrocarbon-affine tracers may be oil, gas or oil and gas affine tracers, an injection port connected to the main bore, of the production pipe or annulus between production pipe (not illustrated) and the borehole wall, an outlet channel from the reservoir to the injection port, a release valve between the outlet channel and the injection port, an electronic controller for the release valve comprising a timer clock for a release signal for a release actuator for the release valve, a battery pack for energy to the electronic controller and the release actuator, arranged in an elongated mandrel main body for extending parallel to the production pipe and arranged for forming a portion of the piping structure of the production pipe.

The invention also relates to a system for multi-phase petroleum well flow characterisation comprising a petroleum well having a production pipe with a production flow, the well having a production zone and transport path downstream of the production zone, the production zone conducting one or more local production flows;
at least two injection positions corresponding to the local production flows which comprise potential target fluids water and hydrocarbon fluids (oil and/or gas), wherein each injection position,
having locally arranged corresponding injection devices each having a reservoir of least a water-affine and a hydrocarbon-affine tracer,
each injection device arranged for simultaneously injecting a set of the water-affine and the hydrocarbon-affine tracer
each injection device further arranged for injecting the set of the water-affine and the hydrocarbon-affine tracer into all target fluids present in the local production flow
at least two of the injection devices arranged for injecting, in a synchronized manner, the sets of the set of tracers,
an online detector in the production flow at a detection point arranged downstream along the transport path;
the detector arranged for
conducting detection of the tracers in the production flow to determine arrival times of the tracers,
a calculating device for calculating a slip time between corresponding arrival times of water- and hydrocarbon tracers and the calculating device arranged for back calculating slip times to local zonal slip times,
the calculating device arranged for, based on the local zonal slip times, interpreting each zone into one or more flow regimes or other characterization.

The invention is also an interpretation method for multiphase petroleum well flow characterization comprising, having arranged a number of injection tools in a well
knowing the geometry of the flow path from the injection points to an online detection point for the well, this geometry including at least pipe diameters and lengths.
recording the arrivals of tracer responses from one or more injection locations in the well
  i) calculate differences in arrival time between the tracer responses from each injection location for all monitored phases
  ii) using the spatial differences between installation locations and the calculated arrival times, calculate phase velocities and phase velocity differences for all monitored phases between injection locations
  iii) using representative flow regime map for the well being monitored to establish the flow regime between each injection location based on the observed phase velocities for each fluid phase
  iv) using a multi-phase simulator or correlations for the multi-phase flow in order to match observed flow characteristics (velocities and regimes) along the wellbore and consequentially deduce flow characterization such as inflow distribution along the wellbore of the monitored phases.

FIGURE CAPTIONS

The attached figures illustrate some embodiments of the claimed invention.

FIG. 1 is an overall monitoring principle with the indicated steps
100) Release of tracer material
200) Flow to top-side production facility
300) Detection of tracer response
400) Interpretation of tracer responses
500) Monitoring data produced The overall monitoring principle is illustrated in FIG. 1 general overview of the monitoring procedures is shown. The three essential components for the method application are: 100) Controllable release of tracers in several locations along the well; 300) Tracer detection topside with sufficiently high time resolution; 400) Interpretation of tracer signal using a multi-phase simulator or correlations to derive zonal inflow along the well of at least one phase, water, oil and/or gas.

FIG. 2 is an illustration of an injection arrangement of an embodiment of the invention and indicates simultaneous injection of oil, water, (possibly also neural and partitioning) tracers downhole at multiple locations. The figure gives example of tracer distribution in the well. Sketch indicate oil and water partitioning tracers at each injection station, however the concept could be extended to an embodiment of injecting a number of oil tracers, a number of water tracers, a number of gas tracers and/or a number of tracers not having strong affinity to any particular phase.

FIG. 3a is an illustration sketch of laboratory test set up. The figure shows a flow loop, for instance a transparent pipe line, having an injection point for tracers on top of the figure and a detection point at the bottom. The fluids may be oil and water in continuous circulation. At the tracer detection point, the oil tracer is detected in top oil phase and the water tracer is detected in bottom water phase.

FIG. 3b is a graph of data showing slip measurements. The observation of oil-water slip velocity in the flow loop. Particular case corresponds to the segregated flow of oil and water. Both oil and water tracers were injected simultaneously and were observed for several rounds around the flow-loop. (50 m loop length, 100 mm inner diameter of flow-loop pipe, flow rate 250 liter per minute, water cut 50%).

FIG. 4 shows an example of tope side signals which can be used for the interpretation of zonal inflow. Arrival timing between locations and between phases from same location will give slip velocities and inflow distribution estimates or other well characteristics though history-matching. Note that slip velocity may be positive and negative (oil moving faster than water or water moving faster than oil) depending on the fluids, the flow rates and the geometry and topology of the well.

FIG. 5 shows to the right, pictures of experiment as illustrated in FIG. 3. Showing oil tracer migrating to oil phase quickly. Oil tracer is injected into a 50% water cut oil water flowing system from above. The injected tracer cloud is injected so forcefully that a local mixing of all phases is ensured. After a short time the oil tracers seeks the oil phase on top of the pipe and travels with the bulk of the oil phase. Travel distance before oil tracer is residing in the bulk of the oil phase is in the order of two pipe diameters. Downstream fluorimeters in both the oil and the water phase confirm presence of oil tracer in oil phase and not in water phase. Left upper and lower diagram shows the tracer concentration measured at detection point in the test loop (different scale resolution).

FIG. 6a is a schematic sketch of the probe used to detect tracer topside. Installed in a pipe with flow, F of components Fo, Fg, Fh (oil, gas, water). A communication (CL) line to detectors could be fibers for excitation and detection of tracers. A flange (AP) or similar connection/access port, could be sand detection port is arranged in the pipe wall and multiple detectors (D) at different depths to detect in different phase layers in segregated flow. Such a tool can be inserted into a producing pipe using standard off the shelf equipment such as the Roxar Hydraulic Retrieval tool referenced or utilizing existing access points to the production pipe such as ball-valve, gate-valve or dedicated flange for instrumentation preferably during operation. There are known insertion and retrieving techniques based on hydraulic and mechanical principles offered by for example Roxar and Mirmorax.

FIG. 6b is a schematic sketch of an embodiment of the probe used to detect tracer indicating a protection cap while probe is during installation and FIG. 6c shows the embodiment of FIG. 6b during operation.

FIG. 7a is a simplified cross sectional side view of a detector, an optical probe (D), according to an embodiment of the invention. The inspector windows (1) may be chemical and mechanical resistant glass window protecting the fibers behind arranged with some material or construction to hold fibers in place in a hollow probe body (5), to be inserted into the pipe (4). Behind the windows fiber bundles or single fibers (2) for excitation are arranged. In the upper portion of the figure fiber bundle (2) from excitation source are indicated with a cap on top to protect fibers during installation. Single fibers (3) to receiver, ended with appropriate connector is also shown. Sealing threads (S) for installation purpose are also indicated.

FIG. 7b is a cross section of a possible arrangement of the optical fibers behind the glass window, with excitation fibers (2) surrounding the fiber (3) leading to receiver.

FIG. 8 is a simplified illustration of the detail A from FIG. 6 and shows according to an embodiment of the invention a detail of the probe enlarged for more accurate description. A transparent window (1), either a parallel surface window or a lens shaped window for focusing light emitted by the external phase (fluid) is arranged facing a possible flow (not shown). Fiber optic cable (3) for transmitting light from surrounding fluid (emitted wavelength) out of the probe and to external detection unit outside of the pipe is illustrated. If transparent window is of lens type then end of fiber should be at, or close to focal point of the lens in order to collect as much emitted light as possible. The main body (5) of probe here illustrated with channels made for feeding fiber optic cables through and cavities for holding lenses. Through the body a fiber optic cable (2,3) is feed though for other lens locations. One shown for illustration, more will be needed for a proper realization. Around the lens/window there is indicated fixating screw connection for holding the window in place, preferably with sealing o-ring or similar fitting on each side of the window for isolation.

FIG. 9 is a cross sectional view of the detail B of FIG. 6, an embodiment of the invention, and shows and illustrates more details around the connection probe-measure equipment. On top of the fibers (2,3) optical feed though connection providing seal between fiber and main body of probe are illustrated. After installation of probe, external instrumentation (light source and detector) are connected with standard connections. Optical feed through connections may be found for single fibers and for bundles of fibers. For instance, as supplied by SQS Vlaknova Optika as. Other features indicated are: Set screw securing the probe in place, flange permanently attached to the pipe and, O-ring or other seal between probe and flange.

FIG. 10a shows a cross sectional view of a carrier unit of the injection tool according to an embodiment of the invention. Here multiple injector tools are arranged in the circumference of a pipe hub. Details shown are groove (120) for plug installation, threaded plug (121) for keeping injection tool (I) in place, injection tool mandrel main body (122), threaded pin (124) end for connection to a completion string.

FIG. 10b is a cross sectional cut of the embodiment according to FIG. 10, position AA, i.e. cut through the injection ports (103).

FIG. 10c is a cross sectional cut of the embodiment according to FIG. 10, position BB.

Figure 13:
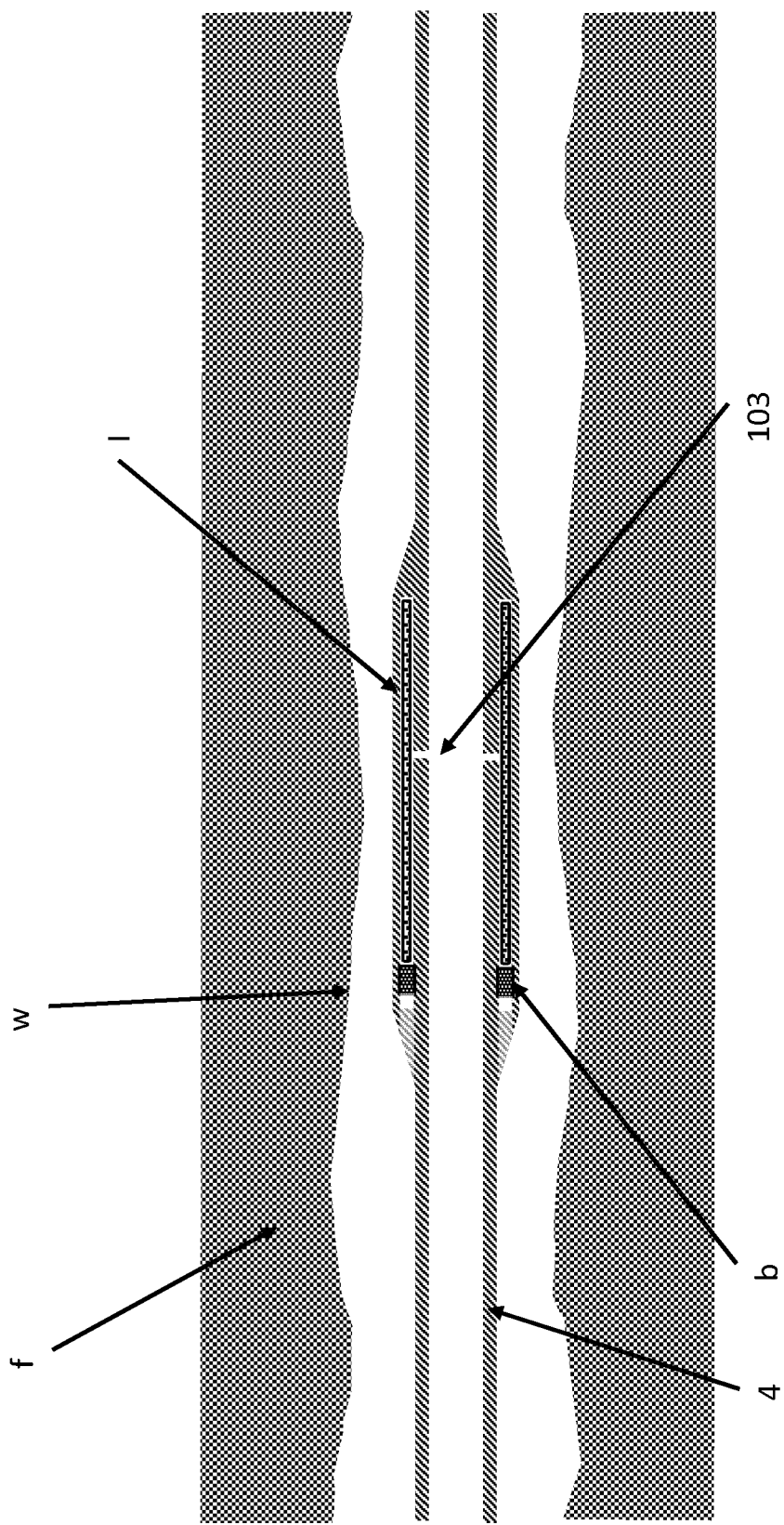

FIG. 13 showing a mandrel/carrier configured to inject the tracer injection (Trw, Trh) into the interior of the base pipe (4) in a well. The illustration further points out a fastening device (125), here a bolt, to hold injection tool in slot and the well formation (43) with the borehole wall (44).

Figure 14:
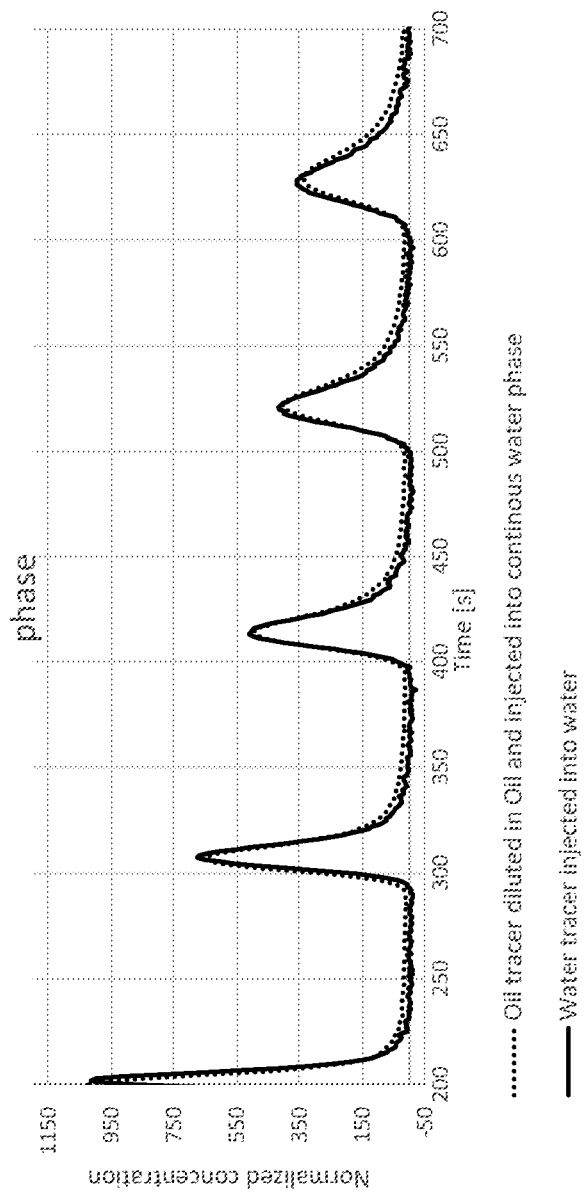

FIG. 14 is a measured signal comparison of the tracer signal which was injected into continuous non-target phase with the signal of tracer which was injected into the target phase. Test was done in the flow loop illustrated in FIG. 3a. The figure shows that the dispersion of target phase tracer and non-target phase tracer are very similar.

Figure 15:
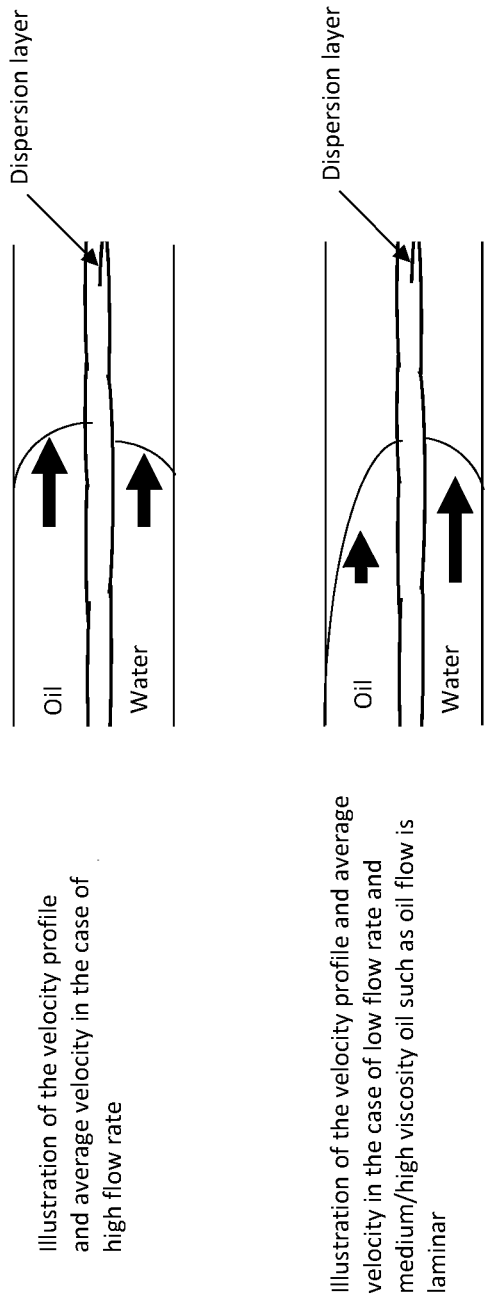

FIG. 15 is an illustration of two different flow profiles, upper for high flow rate and lower illustrates a flow profile for lower flow rate and a medium/high viscosity oil.

Figure 16:
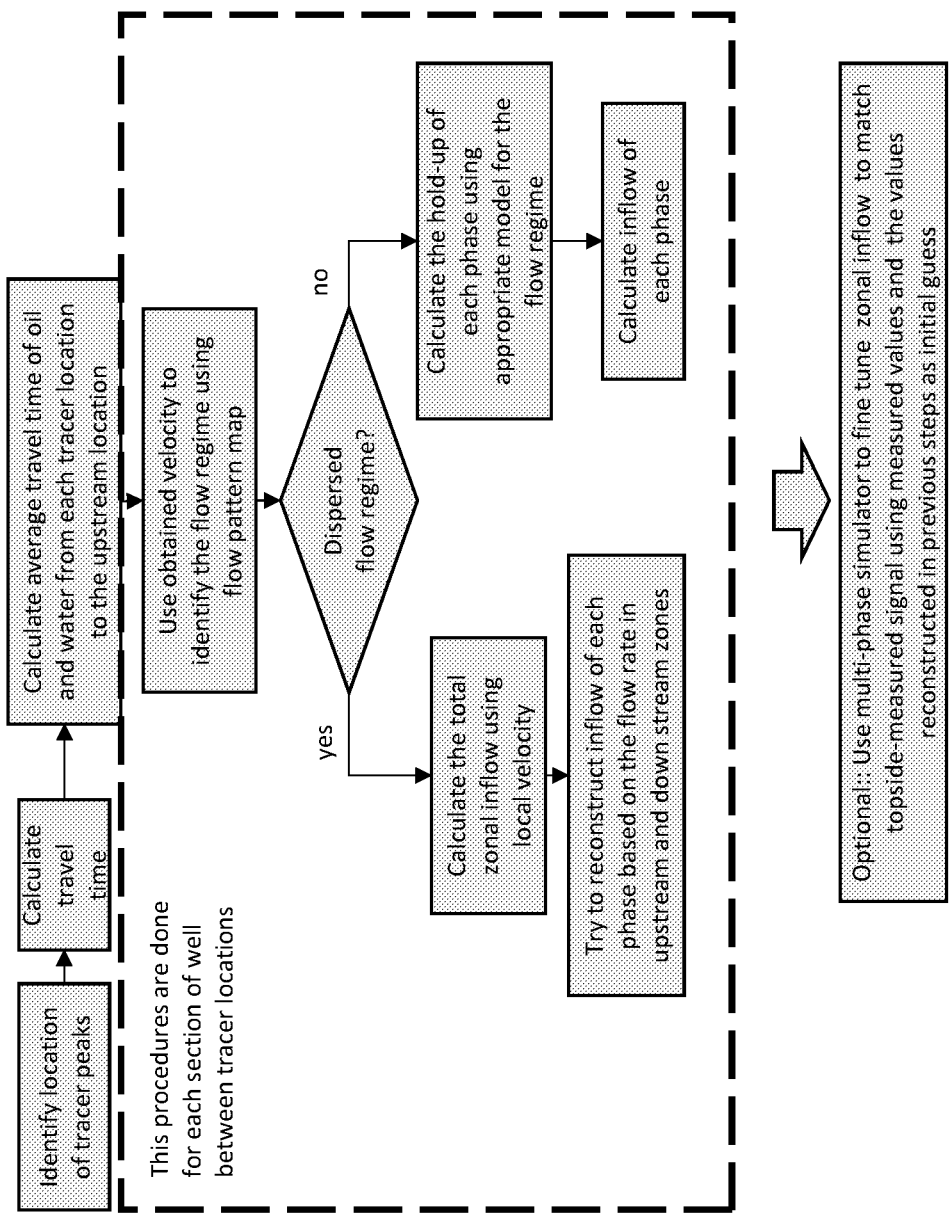

FIG. 16 is a step by step procedure flow chart for zonal inflow calculations. Convection will then further disperse the tracer into the fluids penetrated.

Figure 17:
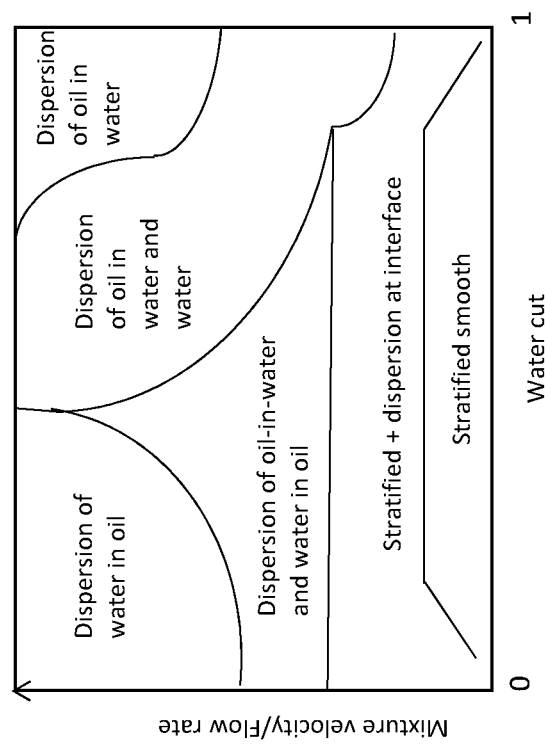

FIG. 17 is an example of the flow regime map for a horizontal flow of oil and water.

Figure 3A:
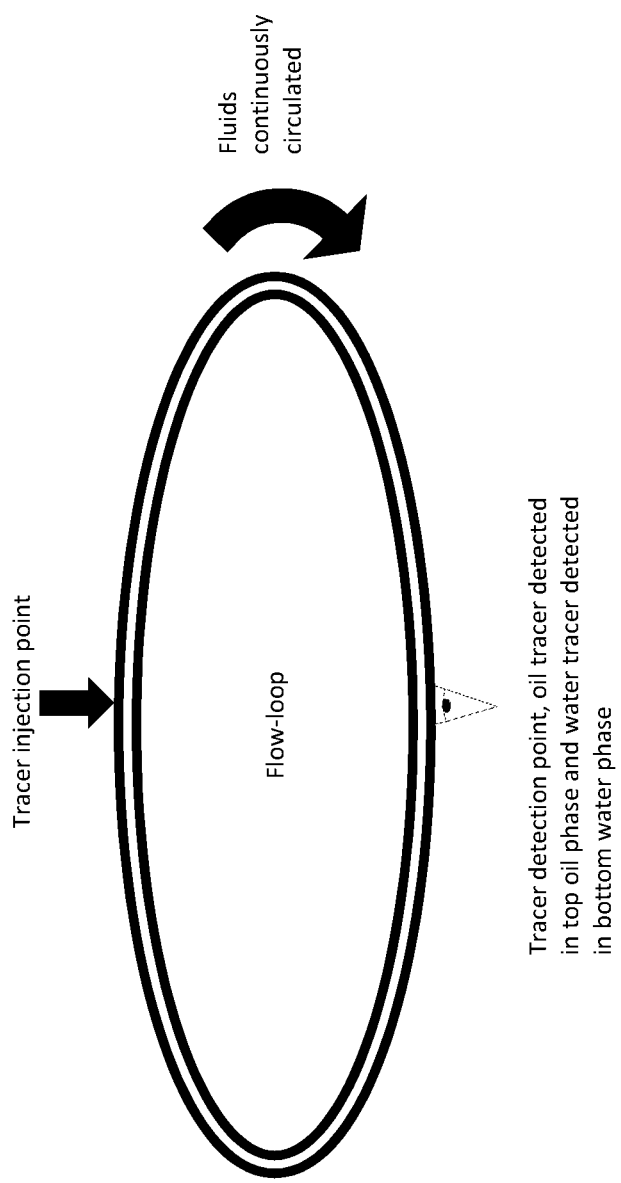

The travel time and slip velocity are further used as input to a multi-phase flow simulator, or as basis for using correlation, to reconstruct the inflow profile in the well. In the case of multi-phase flow, several flow regimes can be observed such as dispersed, annular, segregated, slug flow and others. Each production section is characterized by certain slip velocity which represents the difference in the travel velocity of two phases. For example, no difference in the travel velocity (zero slip velocity) corresponds to the fully dispersed flow; delay of the water tracer relative to the oil tracer combined with the large dispersion of water tracer corresponds to the annular flow of water with oil core; delay of the oil tracer relative to the water tracer and faster dispersion of the oil tracer relative to the water tracer corresponds to segregated/dispersed-segregated flow of the water and oil which has higher viscosity than the water. An example of the laboratory observations of such flow is shown in FIGS. 3a and b.

The tracer injection is performed from wireless injecting tools installed downhole during the well completion, or installed later during the well life. An option of installing a separate liner with tools can be also considered. The number and locations of the tools installation should be designed based on the well length, desired accuracy of monitoring, and expected zonal contribution.

In an embodiment of the invention one may, before conducting step (a), establishing a stable flow regime in the well. It is assumed that the injection is so small that it does not significantly affect the flow in the well.

Controllable Release of Tracers in Several Locations Along the Well

Figure 1:
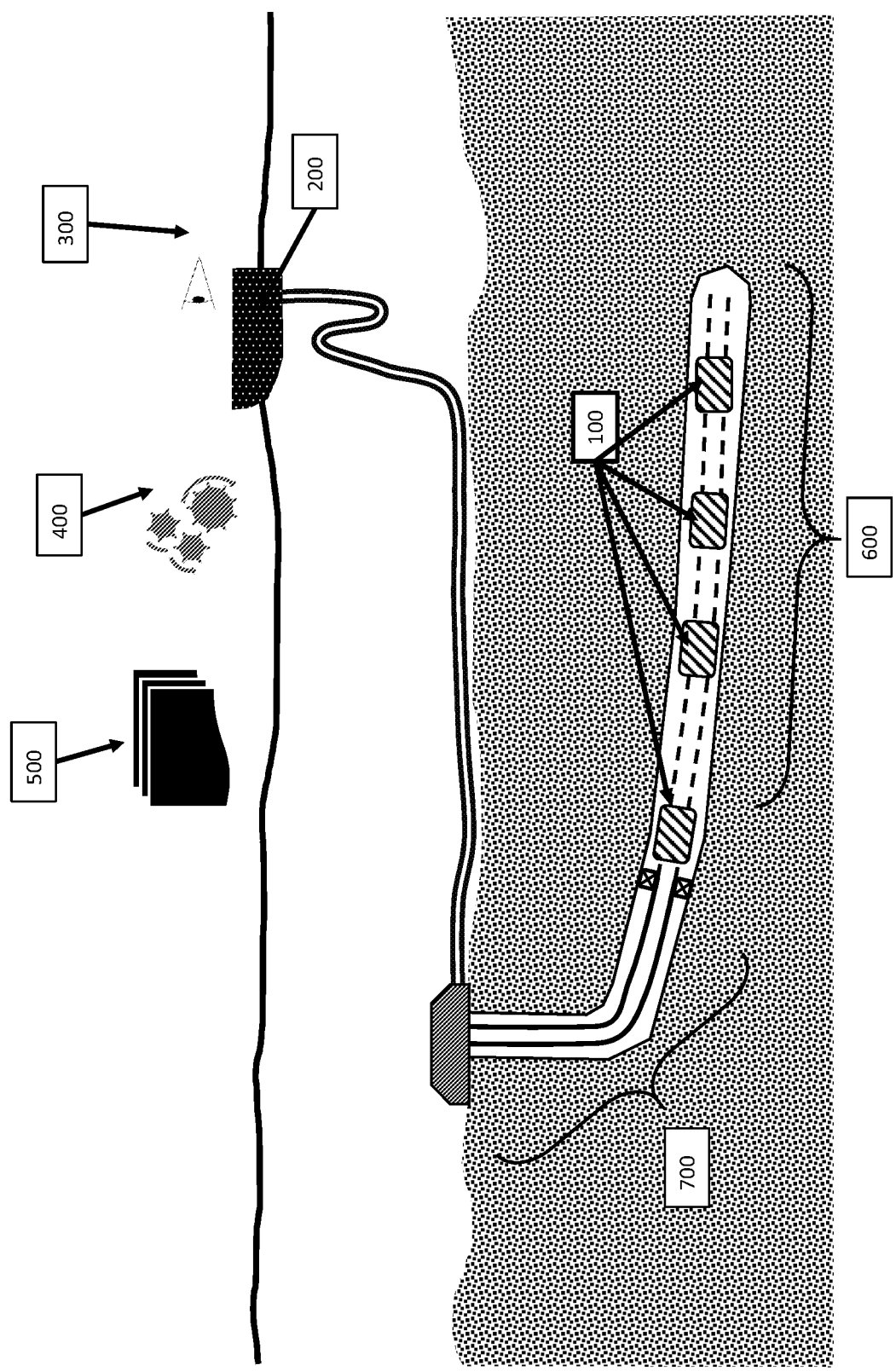
Figure 2:
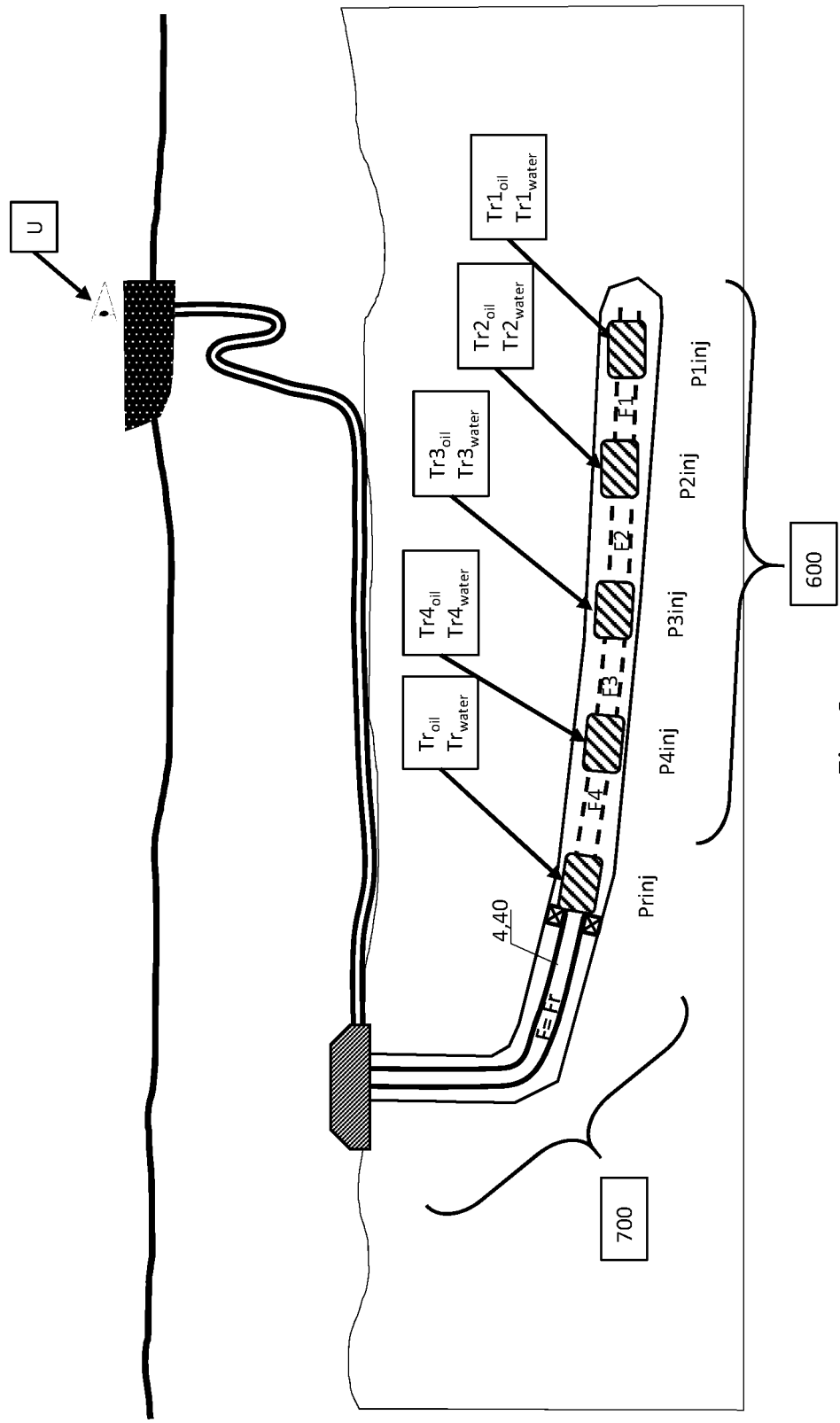

By controllable release is meant simultaneous injection of tracer from several locations in the well. Please also see illustrations in FIGS. 1 and 2. By simultaneous is meant that the uncertainty in time difference between injections at different location ($\Delta T_{injection}$) is far less than the tracer travel time between the locations ($\Delta T_{tracer}$). $\Delta T_{injection}$ is less than 5% of $\Delta T_{tracer}$ and in an embodiment less than 1% of $\Delta T_{tracer}$. The injection can also be done at different time in different locations, however, the time difference between injections should be known precisely and there should not be any change in the well flow regime during the time between injections. The injection can be triggered by a signal or tools can be preprogrammed before installation to inject on a certain date and time. In the latter case the drift of the internal clocks installed in the tool should be less than 10-60 sec per year depending on well configuration and monitoring needs. The drift specifications should be set depending on the required precision of monitoring for each well where the tool is deployed. In a possible realization of the invention the clock in each injection tool is calibrated and compensated for drift at the well temperature where it is to be installed in order to minimize the drift.

Figure 5:
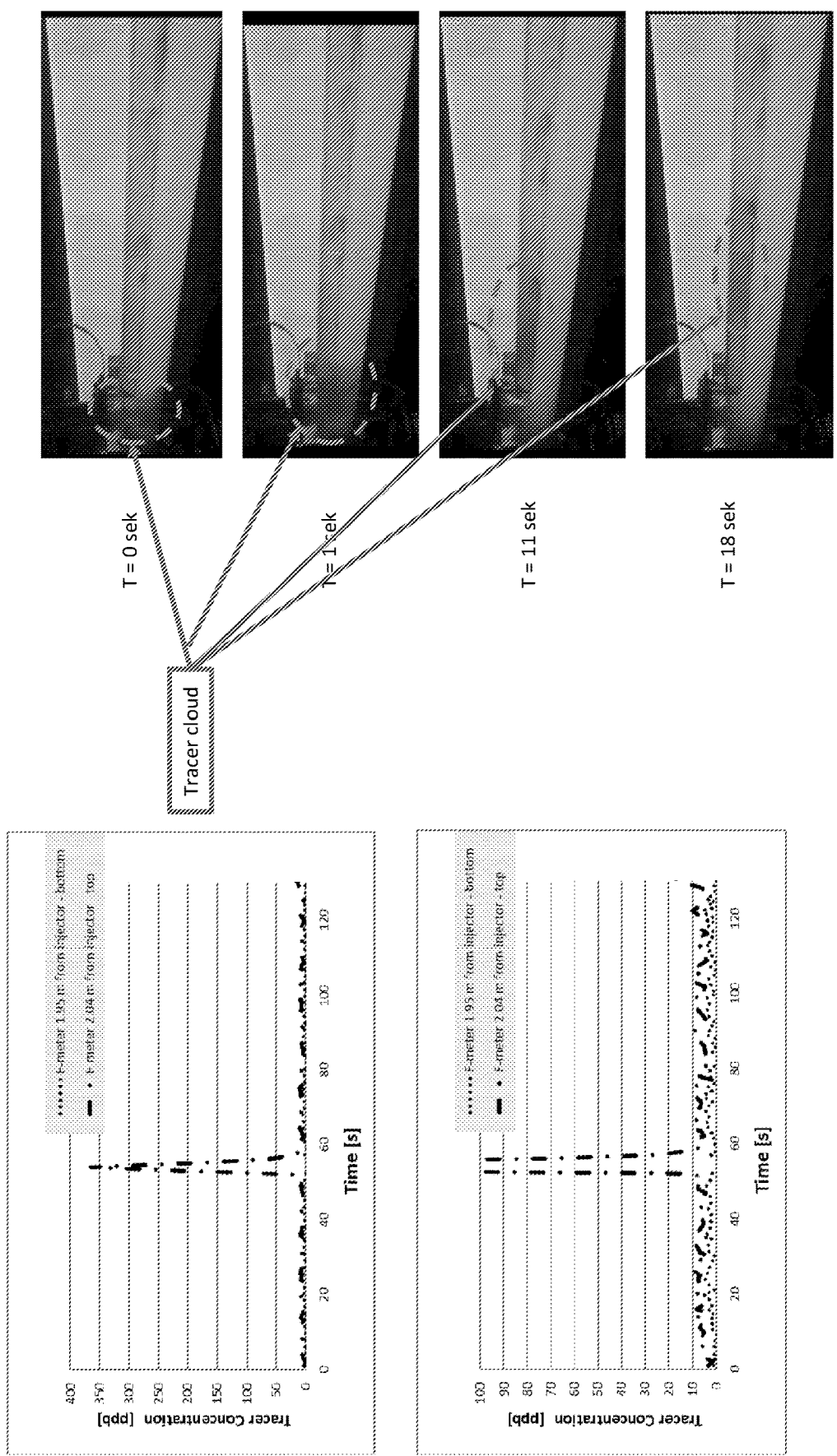
Figure 6A:
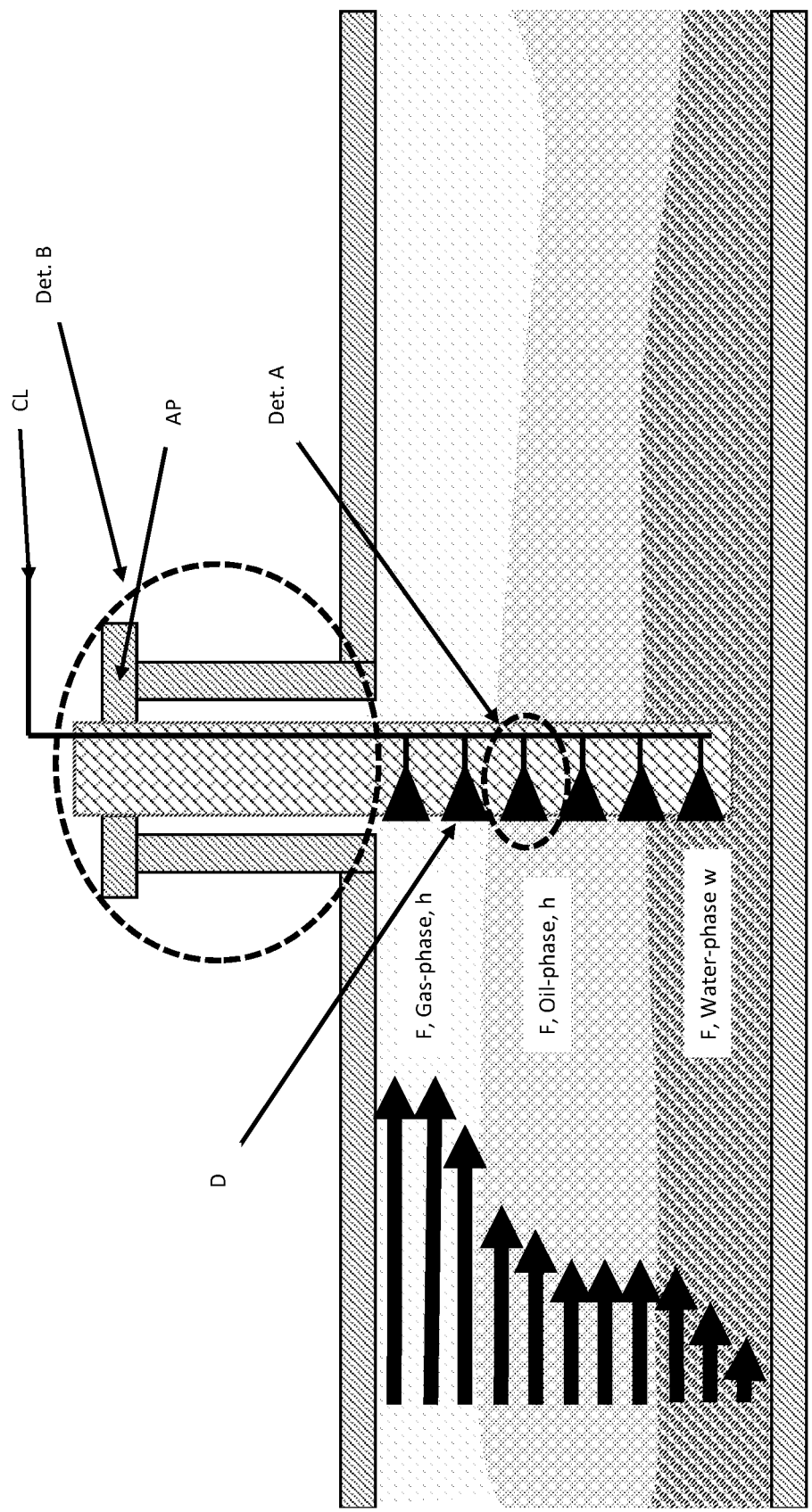
Figure 8:
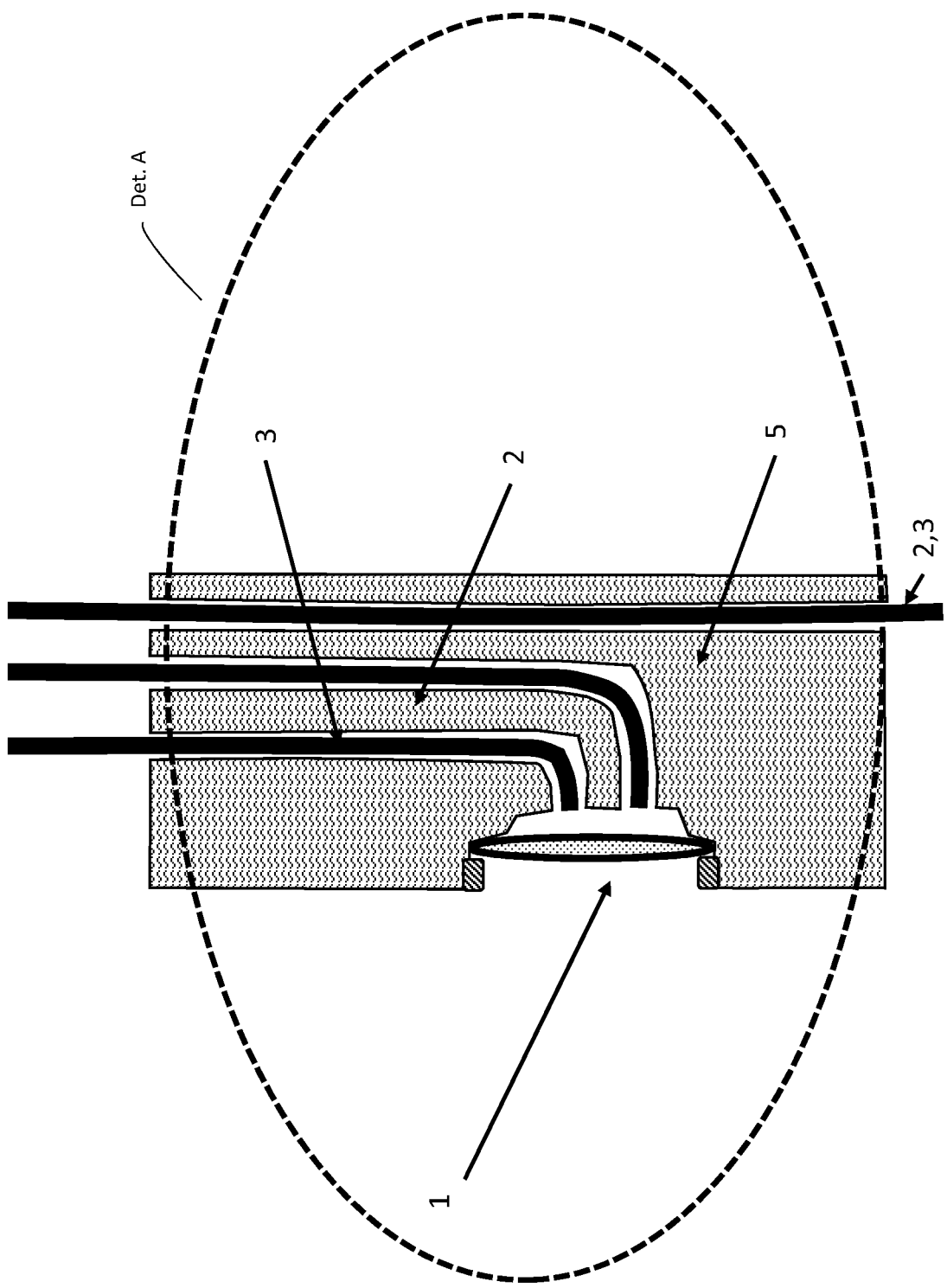

To achieve reliable and interpretable signal it is important that each of the tracer will reach target phase as soon as possible. Laboratory tests showed that the best way to deliver tracer material to the target phase is a powerful injection of tracer solution. Please see FIG. 5 for illustration. The overpressure in the tool during the injection should be significantly, at least 5 bars, more preferably in the range 5-40 bars, and most preferably in the range 20-40 bars or above relative to the base pipe pressure and it depends on the pipe diameter, the flow rate, fluid composition, and degree of local turbulence within and between two phases. The injection can be done using explosive, mechanical springs, pressure bellows, burst disks, hydrostatic pressure, or any means that can generate overpressure and push the tracer material with sufficient force into the produced fluids.

The goal of such injection is to establish stable jet which would penetrate to the opposite wall of the base pipe, recoil and would cause mixing of all fluids in the jet. In such way, rapid delivery of the tracer to the target phase is achieved. For the injection, the oil and water tracer can be each dissolved in two different solvents polar or non-polar or in a solvent, which dissolves both of the tracers like DMSO.
The Tracers Further, when it comes to tracer affinity to target liquid and immiscibility to non-target fluid Stegemeler injects into the intended target fluid and uses a tracer carrier fluid with affinity to that liquid. An essential feature of the invention is the use of tracer carrier fluids with strong immiscibility to non-target fluids. The forceful injection to reach all target fluids results in a rapid unmixing of the tracer carrier fluid from the non-target fluid into the target fluid. The immiscibility in the non-target fluid results in a distribution with less than 1:10 to its non-target fluid phase, more preferably less than 1:100, and most preferably less than 1:1000.

In an embodiment of the invention the method using the water-affine and the hydrocarbon-affine tracer (Trw, Trh) having the property of partitioning less than 1:10 to its non-target fluid phase, more preferably less than 1:100, and most preferably less than 1:1000. i.e. that the hydrocarbon-affine tracer will be injected into the water phase, too, but will rapidly migrate away from the water phase and into the hydrocarbon phase. "rapidly" here means that the migration will occur much faster to the intended phase, about two pipe diameters as observed, much shorter than the flow time to the subsequent injection point, in order to allow the tracers to follow the intended flow regime locally, whatever it is. Please see illustration in FIG. 5.

The choice of the tracer is important. Each oil or water tracer should partition less than 1:10 to non-target phase to avoid misinterpretation. Neutral tracer can be any tracer with partitioning in the range 1:1 or 1:10. Depending on the well being monitored a minimum partitioning coefficient for a tracer towards its target phase should be 1:10. A preferred partitioning coefficient is in excess of 1:1000, which is found for a number of commercially available tracer compounds presently.

I an embodiment of the invention the hydrocarbon-affine tracer (Trh) is an oil-affine tracer (Tro).

I an embodiment of the invention the hydrocarbon-affine tracer (Trh) comprising using a gas-affine tracer (Trg).

Preferably the tracer detector and measurement apparatus is topsides (which is highly advantageous for accessability and maintenance and for measuring slip in the riser part of the production flow). When the tracer carrier fluid reaches the target fluid, the tracer molecules or particles carried in the tracer carrier fluid may migrate from the tracer carrier fluid into the target fluid, and/or the tracer carrier fluid be mixed into the target fluid. This process of injecting into all and having a fast unmixing, preferably occurring along an axial length of the production pipe of about one to ten pipe diameters length, preferably about two to four pipe diameters length, ensures that the unmixed tracer material is distributed very early after the injection process and allows a tracer slip to occur along the production pipe before passing the subsequent tracer injector in the subsequent production zone. In the subsequent production zone where further oil or water or gas is introduced into the now tracer slip impregnated flow, the further influx will only dilute, prolong, and disperse the tracer signal carried along with the production flow, but may be back-calculated or modelled to infer the local slip.

After the last downstream tracer injector, which may be a reference injector, there is no further influx and one may infer the slip along the production path from the heel of the reservoir and to the topsides measurement point, which is useful for the back-calculation of the local slip velocities in the production zone but also highly useful for measuring the slip along the purely transporting part of the production pipe. In other words: it is essential to the present invention to have a short unmixing length as counted from the injection point in one producing zone, compared to the monitoring length, i.e. the length as counted from where the unmixing is generally fulfilled and up to the subsequent injection point, most likely in the subsequent monitored production zone, in order to allow the slip velocity work along the monitoring length. i.e. the unmixing length must be much smaller than the local slip development length or "monitoring length". For such local production zone slip development this may be much larger distances than what may be achieved using a slip measurement logging tool (which would otherwise disturb the slip-generating flow regime due to its presence in the flow cross section). Moreover, slip measurement for the distance from the heel-most injector and up to the topsides measurement point, a distance which may be more than one or two thousand metres, will have far better length to develop the slip than what may be achieved using a slip measurement logging tool.

The tracers can be luminescent dyes, absorbing dyes, Quantum dots (QD), or any other tracers with the distinguishable optical properties. It is important to note that for the most downhole application it is impossible to detect luminescent tracer in the oil due to the requirement of the very low detection limit, <1 ppb. However, injecting a high concentration solution of tracers over a very short period (<~1 s) makes use of luminescent possible. The spectral window where tracers can be detected is from 500-2300 nm. The window is wider for the oils with low asphaltenes and resins content such as light oils and condensates and is narrower for heavy crudes, 1000-2300 nm. Even in this wave length range a typical oil transmits only 10-30% of the light through 2 mm thick film, and only 1-9% through 4 mm. However, the used of the back scattered luminescence allows to overcome this complication. The detectors should then be suitable to detecting luminescent.

In an embodiment tracers may be hydrophobic and hydrophilic chemical compounds which have luminescent properties, or exhibit very high absorption in a narrow wave length which would reduce fluorescence signal of oil. In an embodiment also tracers may be particles containing such components. This is to protect the components from the harsh environment and to protect them from reacting either with the components occurring naturally in oil or produced water.

In an embodiment of the invention the detection of the tracers (Trw, Trh) are conducted using backscattered fluorescence measurements.

According to an embodiment of the invention the optical measurement comprises to emitting light (L1) from a light source (L) through an array of one or more windows (1) arranged across the flow (F), into the flow (F), whereby the light (L1) generates tracer-specific luminescence (L2w, L2h) in the tracers (Trw, Trh) present in the flow (F), then collecting the backscattered light (L2w, L2h) entering, "returning" through the array of windows (1), and calculating light intensity values (LIw, LIh) of light (L2w, L2h) representing the tracers (Trw, Trh) and recording the light intensity values (L2w, L2h) over an appropriate wavelength range. An advantage of emitting light into windows arranged in an array across the flow, or along a sufficient portion of the cross section is that all phases present may be covered, for example half the diameter. The light intensity (L2h, L2w) is sufficient for identifying peaks of tracer luminescence.

According to an embodiment of the invention the defining of arrival times (tw, th) of each detected tracer (Trw, Trh) will be performed by defining a characteristic feature in the record/graph of the light intensity values (L2w, L2h). Such a characteristic feature may be the peak of the signal as above.

One may, in an embodiment, have installed an injector with tracers at a reference point, downstream all inflow zones, where there is no zonal inflow, thus calculated slip from here to the sampling point may be characterized as a transport zone.

In an embodiment of the invention the method comprises placing a reference injection (Ir) at the location (Prinj) at or near above the downstream end of the production zone to measure the transport times of the various phases to the online detection point (U) further downstream. Thereby making a reference measurement by injecting at the end of the production zone to establish the reference point to sampling point slip.

For the injection, the oil and water tracer can be each dissolved in two different solvents polar or non-polar. In an embodiment of the invention the water-affine and a hydrocarbon-affine tracer (Trw, Trh) are injected by the one and same carrier fluid such as for instance a solvent, which dissolves both of the tracers like DMSO.

The method according to an embodiment of the invention comprises the use of a set of at least a water-affine and a hydrocarbon-(oil and/or gas)-affine tracers (Trw, Trh) which are identical for at least two injection positions. Generally different injection zones would be marked by different tracers when they are supposed to give zonal information, but for this invention, when the time resolution is sufficient the tracers will still hold its information value all the way to the detection point. This is an advantage to the method since one does not need so many tracers, makes it less complicated to analyze, and less complicated due to a low stock of different tracers.

In an embodiment of the invention the set of at least a water-affine and a hydrocarbon-(oil and/or gas)-affine tracers (Trw, Trh) are different (unique) for at least two neighbour injection positions. If equal tracers otherwise would be injected "too close", one may alternate with a distinct tracer inbetween the two equal tracers.

In an embodiment of the method set of at least a water-affine and a hydrocarbon-(oil and/or gas)-affine tracers (Trw, Trh) are equal for all injection positions in the well while the separations between consecutive injection locations are sufficient to assign top-side measurements to unique locations downhole.

Only neighboring (neighbor position in the well—not within the pipe hub injector arrangement) tracer should have distinguishable characteristics, i.e., only two oil and two water tracers are sufficient for the application. For example, the same pair of tracers can be used in location 4 and 2, and in location 3 and 1 (see FIGS. 1 and 2). If sufficient separation is achieved in the well (sufficient distance between injection location to have separate arrival peaks at surface) then potentially one oil and one water tracer may be used for the whole well. In an embodiment there are unique tracers at each injection location for each phase.

An embodiment of the method according to the invention comprises to, after a desired time, repeating from step (a) so as for making one or more further injections at further positions along the well., e.g. positions 1 and 3 initially, and subsequently positions 2 and 4, and so on after a desired time. This may be used for instance if e.g. zone 1 and 2 are too near, and we have only one type of Trh and Trw. The spatial resolution will be sufficient with zone 1 and 3.

The method of the invention may in an embodiment also be used for a quick learning initially, e.g. by injecting at 4 different weeks and later at a less frequent monitoring rate. The injection tool will either be preprogrammed by time settings for such an injection frequency or to act on a signal from surface.

In an embodiment of the invention the method comprises the use of the set of at least a water-affine and a hydrocarbon-(oil and/or gas)-affine tracers (Trw, Trh) that also includes a neutral tracer (Trn), the neutral tracer fractionate between the phases. This may be used to increase accuracy of the measurements. A neutral tracer partitioning between the faces may indicate that all of the injected dose should have arrived, or to check whether the oil and water peak are of the same height, etc.

The sampling point may be topside or on a sub-sea template or sub-sea well-head with communication to surface. The sampling point, constituted by an optical measurement may in an embodiment be conducted through an existing (erosion) probe access point, such as a Roxar type erosion probe point or other access point listed above. One may then replace the sampler, optical probe, without disturbing the production flow.

An advantage of having a probe inserted through a standard probe access device is that the probe may be installed and replaced on demand and when necessary. Integrity issues, like scaling on their surface, pollution material settling or sticking or otherwise precipitating on the window surface of the probe can then be resolved by replacing the probe without shutting down production. The probe may be extracted safely using a lock chamber with at least an inner and an outer valve, and a replacement probe inserted via the same lock chamber.

In an embodiment the clocks of the injectors may be synchronized by a signal from a tool lowered or released into the well, or by a remote signal such as a pulse train or EM pulse. In the case of tool synchronization, a wireless link can be established between the tool run into the well and the injection devices at each station synchronizing the time for each injection device and optionally setting a updated injection time for each device. In the remote signal case, a pulse may be sent down into the well (electromagnetic or pressure based) and received by the injector devices. In one embodiment the injector devices has a "listening interval" where they actively listens for such pulses in order to limit the battery consumption of the device. One realization of this interval could be a 1 hour period once a week. The device will then listen for a pulse signature and in a preferred embodiment a verification signal is required at a later time interval. The travel time for both pressure and electromagnetic pulses are sufficiently well known so that the injection devices can be synchronized by the time at which they receive the signal. For the pressure pulse realization time, corrections relative to depth of the injection device may be needed, depending on the length of the well, the pulse travel velocity and the required accuracy. An electromagnetic pulse may be generated by a well-head device electronically controlled from surface. The pressure pulse may be generated by manipulating the well choke to generate the required strength and duration of the pulse. Similar pulsing/signaling may be used to trigger the injection devices at a desired time set after the injection device have been installed downhole in a well in contrast to the pre-set time injection mentioned above.

Development has taken place regarding high temperature batteries over the last few year, and in particular the self-discharging phenomena limiting the use of batteries at high temperatures over prolonged time intervals. As an example, ELECTROCHEM is commercially delivering Lithium battery cells that are rated to 200 deg C. This covers the vast majority of hydrocarbon producing wells at present.

In an embodiment of the invention the tool could be set-up to inject tracers in response to locally measured quantities such as pressure, temperature, water hold-up, salinity or any other property measurable from where the tool is installed. The injection could be set to occur upon the tool registering a given local condition such as temperature or pressure dropping below a given value. Alternatively, injection could be set to occur at a pre-set time but with a sequence of delays to signal the observed value, or a combination of tools with relative delays in their injections could be used to signal a downhole observation.

In a preferred realization of the invention a number of injection tools are placed at each station along the length of well to be monitored. This allows for repeating the simultaneous injection at each station over time using a new set of tools at each station for each injection campaign. This enable monitoring of the performance of the well over considerable time intervals. An example would be to do an injection campaign once a month for 3 years in a well to monitor the changes in production flow. For each campaign one injection tool at each station will inject the tracer dedicated to that station. This strategy would require for instance 36 injection tools to be placed at each station. The number of tools and duration of monitoring would have to be based on the need for monitoring in the well, available space at the installation location and the expected lifetime of the injection tool.

Tracer Detection Topside with Sufficiently High Time Resolution

The invention is also a detection probe arrangement to use with the method in the system. More specific the invention is an optical inline tracer (Trw, Trh) detection probe (D) for a multi-phase petroleum well inflow characterization system in a production pipe (4) with a production flow (F) comprising one or more of inspection windows/lenses (1) along at least a first sensor body (5) arranged across one or more of potentially present fluid phases in the production flow (F), a light source (L) for generating light (L1) capable of generating luminescent light (L2) in the tracers (Trw, Trh)— one or more optical fibres (2) through the sensor body (5) for guiding the light (L1) to and through the windows (1) into the flow (F), one or more optical fibres (3) through the sensor body (5) for receiving backscattered luminescence (L2) arriving "back" through the window (1) and guiding the light (L2) to a luminescence detector (30) arranged for calculating light intensity values (LIw, LIh) of light (L2w, L2h) representing the tracers (Trw, Trh), a registering unit (31) arranged for registering the light intensity values (L2w, L2h). Such probe can be installed through the flange into the production pipe upstream the first stage separator to avoid smearing of the signal or downstream separator if it does not hinder calculation of zonal inflow. The main feature of the probe is the possible use of several detectors across the pipe cross-section. The goal is to be able to measure tracer concentration in each of the segregated phases. In the case of the well mixed flow, the array of detectors can be used to enhance reliability of the signal. Please see FIGS. 6a, 6b, 6c, 7a.

The excitation light and emission light can be transferred using fibers to and from the array of detectors, therefore, the probe can have small dimensions and the detecting spectrometer and light source can be installed elsewhere. Thus, the detector can comprise of two parts, purely mechanical component which contains optical fiber and lenses (probe) and the excitation/emission source/detector (detector). The probe can be installed into the flowing pipe using hydraulic retriever tool which excludes the need to stop production, as illustrated in FIGS. 6b, 6c, 7a and 9. The probe can be also retrieved for maintenance and to preserve it from the effect of scaling, wax build-up or erosion. The measured signal is spectral intensity of the backscattered luminescence over the range of wave length. The measured signal can be converted into a time series of the concentration of each tracer topside.

The optical online tracer detection probe according to the invention may have a first sensor body (5) extending across a significant portion of the diameter, for example such as half the cross section diameter of the production pipe (4) with the production flow (F). or the first sensor body (5) may extend across the full or the majority of the diameter of the production pipe (4) with the production flow (F). In an embodiment a second sensor body (5) extends across at least a remaining portion of the diameter of the production pipe (4) not covered by the first sensor body. i.e. the two sensor bodies together covers at least the diameter of the production flow, covering all phases at the sampling point. The second sensor body (5) should be arranged near the first sensor body (5) along the axial dimension of the production pipe (4). In other words, they are generally at the same axial position when seen in the larger picture, their difference in position is negligible as compared to the distance between two injectors downhole.

The sensor body could in an embodiment be arranged as an elongated sensor body (5) extending into and across the production flow (F) in an otherwise known mechanical or hydraulic retriever tool access port (42) in a pipe wall (41) of the production pipe (4) for an easy mounting of the optical probe (5) and easy to replace when needed.

An optical probe according to the invention may in an embodiment comprising a detector (30) comprising one or more photodetectors (31).

In an embodiment the detector (30) comprises one or more photospectrometer (32). The shape of the insert to the pipe can vary, however, the glass windows (1) should be preferably located where the flow speed is maximal.

In the case of cylindrical probe such positions are 40-70 degrees from the upstream stagnation point. This should help against clogging of the glass and it should secure quick response on the change of fluid properties.

All embodiments of the optical detector may be arranged for conducting continuous measurements or continuous over a certain time period. This is a major advantage of using an optical probe detector extending into the pipe and connected to a registering unit elsewhere. Thus, the need for withdrawal of fluid samples or arrangements of side flows etc. for analysing and measurements are eliminated.

Recording of the signal can be continuous in the case one of the tools down hole can register and send a signal to report event downhole or the recordation can be set to be turned-on on demand, for example, when the tracer injection is expected to arrive topside.

Received signal should be recorded with the frequency which allows capture of distinguishable downhole event. For the well inflow quantification it is important to be able to measure the difference between arrival of each tracer topside. In the case of multi-phase flow, requirements are more restrictive to perform inflow quantification, it is required to measure the difference between arrival of each tracers with different affinity (i.e., oil or water, or gas) which were injected from the same location. The time difference between arrival time is very different for different wells. For the wells with low production and difference between arrival time can be hours or even close to a day. For the short high-producing wells the required time resolution can be sub-minutes or can be even close to seconds. In the case when the dispersion of the signal is of interest or the expected difference in arrival time due to slip is expected to be small, the requirement for the time resolution can be less than a second.

The number of measurement between each arrival is defined by the required accuracy, for the coarse measurements and for a well with well-defined inflow locations, it can be 1-2 samples between arrivals of tracers to be measured. When the high accuracy of inflow estimation is required, the resolution should be at least 10 recordations between arrivals, better 100 recordations between arrivals. There is no upper limit, higher inflow resolution would just improve accuracy.

Injector Power and Control

The invention is also a tracer injector arrangement to use with the method in the system. More specific the invention is a tracer injection device (I), for the multi-phase petroleum well flow characterization system in a production pipe (4) with a production flow (F) comprises, as illustrated in FIG. 10a to FIG. 13, at least one reservoir (101) for at least a water-affine or a hydrocarbon-affine tracer (Trw, Trh), the hydrocarbon-affine tracers may be oil, gas or oil and gas affine tracers, an injection port (103) connected to the main bore (40), please see FIG. 10, of the production pipe (4) or annulus between production pipe (4) (not illustrated in FIG. 11) and the borehole wall, an outlet channel (102) from the reservoir (101) to the injection port (103), a release valve (104) between the outlet channel (102) and the injection port (103), an electronic controller (106) for the release valve (104) comprising a timer clock (108) for a release signal (109) for a release actuator (110) for the release valve (104), a battery pack (111) for energy to the electronic controller (106) and the release actuator (110), arranged in an elongated mandrel main body for extending parallel to the production pipe (4) and arranged for forming a portion of the piping structure of the production pipe (4).

Figure 11:
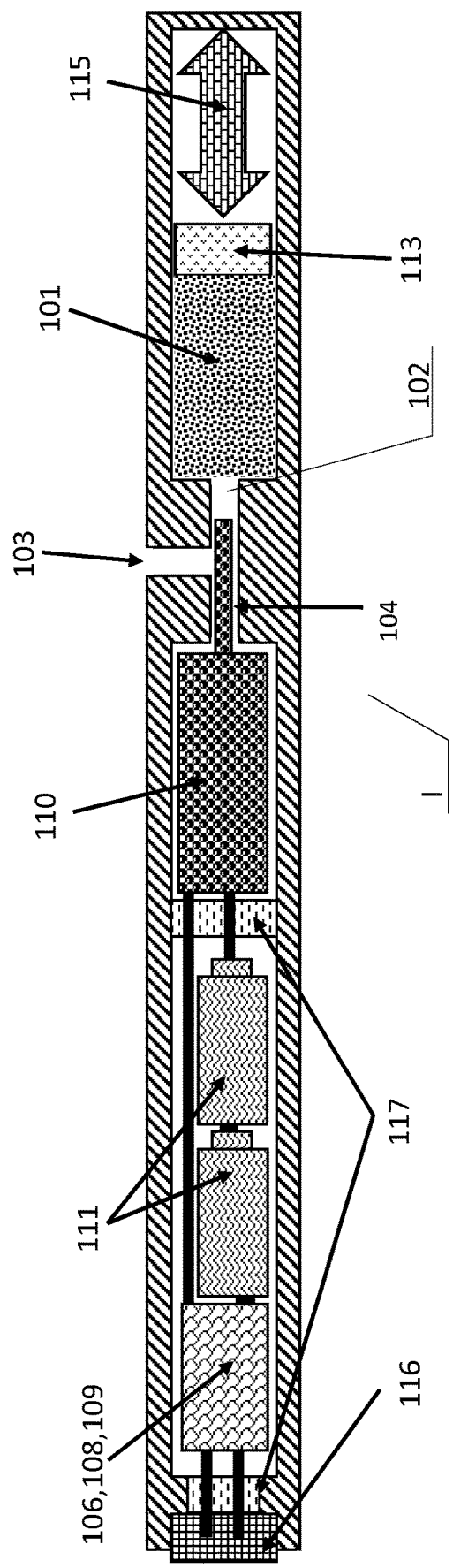
FIG. 11 is a simplified cross sectional side view of an embodiment of the injection device (I) according to the invention.
Figure 12:
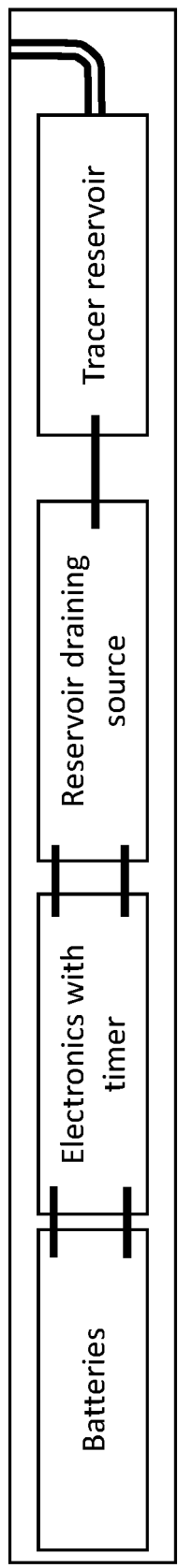
FIG. 12a illustrates the injection device with main features according to an embodiment of the invention.
FIG. 12b shows an embodiment of the injection device (I) arranged around the circumference of the mandrel in a section of the production pipe (4) according to the invention, partly cut through an partly transparent. The reservoir for tracers (Trh, Trw) is illustrated for one of the injectors.
Figure 12:
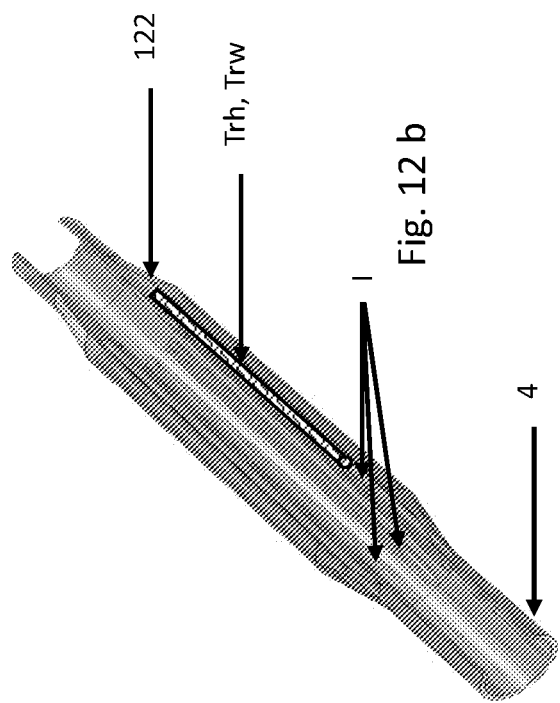

The injector as illustrated in FIG. 11 may also comprise a removable lid (116) for tool programming and electronic feedthrough.

In an embodiment of the injector the reservoir (101) comprises a release piston (113) and a compressed release spring (115) and the reservoir (101) will be pressurized when the injector is installed in the well. The advantage of a piston is that the pressure may be adjusted for a fast and over pressured, related to pipe flow pressure, emptying of the tracer reservoir into the pipe by pressure balancing the tool by letting the wellbore pressure act on the piston (113). A motor or pump, or the like, driven system would most likely not give the force and speed required.

According to an embodiment of the invention the pressurized release spring (115) is arranged for giving an injection over pressure for the set of tracers (Trh, trw) of at least 5 bars, more preferably in the range 5-40 bars, and most preferably in the range 20-40 bars or above relative to the base pipe pressure in order to reach all target fluids (w, h) present in the local production flow (Fr, F1, F2, F3) simultaneously, i.e. Injecting the tracer through all phases at the same time and automatically mixing into the flow phases.

Stegemeler controls the injection process using AC current connected to the production piping and the casing in order to control the injection device downhole on the production pipe at or near the production zone. Stegemeler presents his power and signal supply as an alternative to prior art use of electrical cables. The present invention uses an injection device arranged with a local time controller and power supply in the form of a battery within the injection device locally in the production zone, together with a controlled injection mechanism and a tracer liquid reservoir. The tracer injection device may be remotely synchronized, re-set, re-energized, but is set to operate autonomously when set to trigger at a given time.

In an embodiment of the injecting tool, the reservoir (101) comprises two or more parallel operable containers for at least a water-affine and a hydrocarbon-affine tracer (Trw, Trh). The injector may comprise more chambers for tracers, to be injected simultaneously, depending on the choice of carrier fluid for the tracers. If the tracers will be carried by different fluids which it is not favourable to mix before injection into the different phases of the production flow then they may be installed in separate chambers/reservoirs in the injection tool. The tracers may be carried by the one and same injection fluid and then only one chambers/reservoir is needed in the injection In an embodiment of the invention the injector is a battery of injectors wherein two or more injectors (I) are arranged circumferentially around a pipe section and for forming a portion of the piping structure of the production pipe (4). This gives a possibility and the advantage to repeating tests by fire at different predetermined times. For instance, one may, after a delay time [days, weeks, . . . years], making one or more further injections in the previously used positions in order to detect possible significant change in slip values and thus infer change in local flow regimes. Also, one can use the method and change the total flow in order to check whether one of the flow regimes change depending on the flow.

Also one may do injection from the injector dependent on the observed value of some local property at the place of installation of the injector such as temperature, pressure, water hold-up, salinity or other measurable quantity. This may be implemented in a programmable tool (106) implemented in an embodiment of the injector which communicate with the synchronizer for the clock arrangement (108).

The System for Multi-Phase Petroleum Well Flow Characterisation

The invention also relates to a system for multi-phase petroleum well flow characterisation comprising a petroleum well (600,700) having a production pipe (3) with a production flow (F), the well having a production zone (600) and transport path (700) downstream of the production zone (600), the production zone (600) conducting one or more local production flows (Fr, F1, F2, F3);

at least two injection positions (Pr, Pin, P2inj, P3inj) corresponding to the local production flows (Fr, F1, F2, F3) which comprise potential target fluids water (w) and hydrocarbon fluids (h) (oil and/or gas), wherein each of the injection positions (Prinj, P1inj, P2inj, P3inj), having locally arranged corresponding injection devices (Ir, I1, I2, I3) each having a reservoir of at least a water-affine and a hydrocarbon-affine tracer (Trw, Trh), each the injection device arranged for simultaneously injecting a set of the water-affine and the hydrocarbon-affine tracer (Trw, Trh)

each the injection device arranged for injecting the set of the water-affine and the hydrocarbon-affine tracer (Trw, Trh) into all target fluids (w, h) present in the local production flow (Fr, F1, F2, F3)

at least two of the injection devices (Ir, I1, I2, I3) arranged for injecting, in a synchronized manner, the sets of the set of tracers (Trw, Trh), an online detector (D) in the production flow (F) at a detection point (U) arranged downstream along the transport path (1);

and the detector (D) is arranged for conducting detection of the tracers (Trw, Trh) in the production flow (F) to determine arrival times (trw, trh, t1w, t1h, t2w, t2h, t3w, t3h) of the tracers (Trw, Trh), a calculating device for calculating a slip time (Δtwhr, Δtwh1, Δtwh2, Δtwh3) between corresponding arrival times (trw, trh, t1w, t1h, t2w, t2h, t3w, t3h) of water- and hydrocarbon tracers (Trw, Trh) and the calculating device arranged for back calculating slip times (Δtwhr, Δtwh1, Δtwh2, Δtwh3) to local zonal slip times (Δtzwhr, Δtzwh1, Δtzwh2, Δtzwh3), the calculating device arranged for, based on the local zonal slip times (Δtzwhr, Δtzwh1, Δtzwh2, Δtzwh3), interpreting each zone into one or more flow regimes or other characterization.

The system will benefit from all the technical features and the method steps described above even though the apparatus may be used in combinations with other systems as well.

In an embodiment of the system the tracers (Trw, Trh) are luminescent or have specific light absorbing characteristics. Other tracer characteristics described by the method and devices of the invention will be adapted to the system. The system will have the tracer arranged in different positions, according to different embodiments, as unique or identical neighbouring tracers as for carry out the method as described above, i.e. a hydrocarbon-(oil and/or gas)-affine tracers (Trw, Trh) are identical for at least two injection positions, are different (unique) for at least two neighbour injection positions, equal for all injection positions in the well while the separations between consecutive injection locations are sufficient to assign top-side measurements to unique locations downhole and it also may include a neutral tracer (Trn), which fractionate between the phases.

According to an embodiment of the system the detector (D) is an optical detector.

In an embodiment of the system the at least a pair of the injection devices (Ir, I1, I2, I3) each comprising a timer dock (108) arranged for synchronization with each other. In this way a trigger at one injection point sets an injection time and this will synchronise with the timer clock in at another injection point and the injectors will be ready for synchronized injections. I.e., the timer clocks (108) are arranged for synchronization triggered by other synchronizing action such as pressure pulsing the well.

In an embodiment the timer clocks (108) are arranged for synchronization with a topside control device.

Figure 3B:
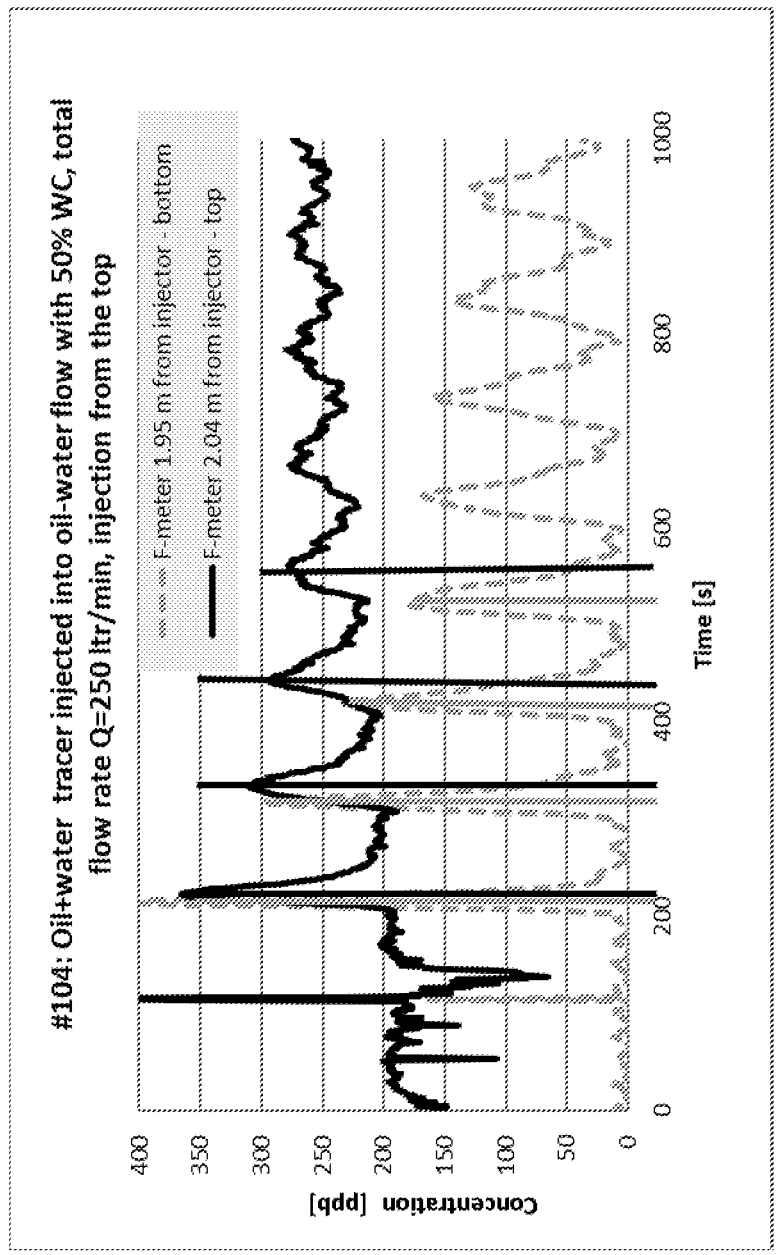

According to an embodiment of the invention the calculating device is arranged for defining arrival times (tw, th) of each detected tracer (Trw, Trh) by defining a first significant characteristic feature in the record/graph of the light intensity values (L2w, L2h). Please see examples FIGS. 3b and 4 for signals.

In an embodiment of the invention the system will have at least two local production flows (Fr, F1, F2, F3) which comprise potential target fluids water (w) and hydrocarbon fluids (h) (oil and/or gas) having corresponding injection positions (Pr, Pin, P2inj, P3inj) and the injection devices (Ir, I1, I2, I3) each are arranged locally corresponding to injection positions (Prinj, P1inj, P2inj, P3inj).

An embodiment of the invention has an injector (I) for reference injection (Ir) at a location (Prinj) at or near above the downstream end of the production zone to measure the transport times of the various phases to the sampling point further downstream.

In an embodiment of the system a flow control valve is arranged for changing the total flow in order to check whether one of the flow regimes change depending on the flow. This may be any installed flow controlling valve which may be set up to change the total flow.

In an embodiment of the system the detection point is topside.

Stegemeler describes a sampling point near the surface. This resembles the present invention's position of the tracer detection and measurement point. However, the present invention differs significantly in that it uses a sensor which resides within the cross-section of the production flow and detects tracer molecules or particles present in all parts of the flow, i.e. in an annular water flow along the production tubing wall, and in a central, cylindrical oil or gas flow; one may take an average measurement without regard to which part of the "measurement stick", which is arranged across a significant part of the flow diameter, registered which tracer, but one has also the possibility of sorting measurements detected along discrete bins along the length of the detector array in order to assess which tracer is detected where. This may be used to additionally characterize the sampling point flow before separation of the production flow. The detector may hardly be located after a separator and thus distributed on water, gas and oil output lines, because the residence times for such fluids in the separator may ruin the slip velocity formed differences in arrival time. Thus, the invention differs significantly for any such post-separator measurement except for in-line production pipe separators which hold very little fluid volume as compared to a separator tank with far higher cross-section compared to the production flow.

In an embodiment of the system the detection point is arranged just after a last influx point before the transport path (1).

According to an embodiment of the system the optical detector is arranged in an erosion probe access point or a ball or gate valve facilitating access to the production pipe.

Interpretation of Tracer Signal Using the Multi-Phase Simulator to Derive Zonal Inflow Along the Well of at Least One Phase, Water, Oil and/or Gas.

The invention is also an interpretation method for multiphase petroleum well flow characterisation comprising, having arranged a number of injection tools in a well knowing the geometry of the flow path from the injection points to an online detection point for the well, this geometry including at least pipe diameters and lengths.

Recording the arrivals of tracer responses from one or more injection locations in the well a) calculate differences in arrival time between the tracer responses from each injection location for all monitored phases b) using the spatial differences between installation locations and the calculated arrival times, calculate phase velocities and face velocity differences for all monitored phases between injection locations
c) using representative flow regime map for the well being monitored to establish the flow regime(s) between each injection location based on the observed phase velocities for each fluid phase
d) using a multi-phase simulator or correlations for the multi-phase flow in order to match observed flow characteristics (velocities and regimes) along the wellbore and consequentially deduce flow characterization such as inflow distribution along the wellbore of the monitored phases.

Figure 4:
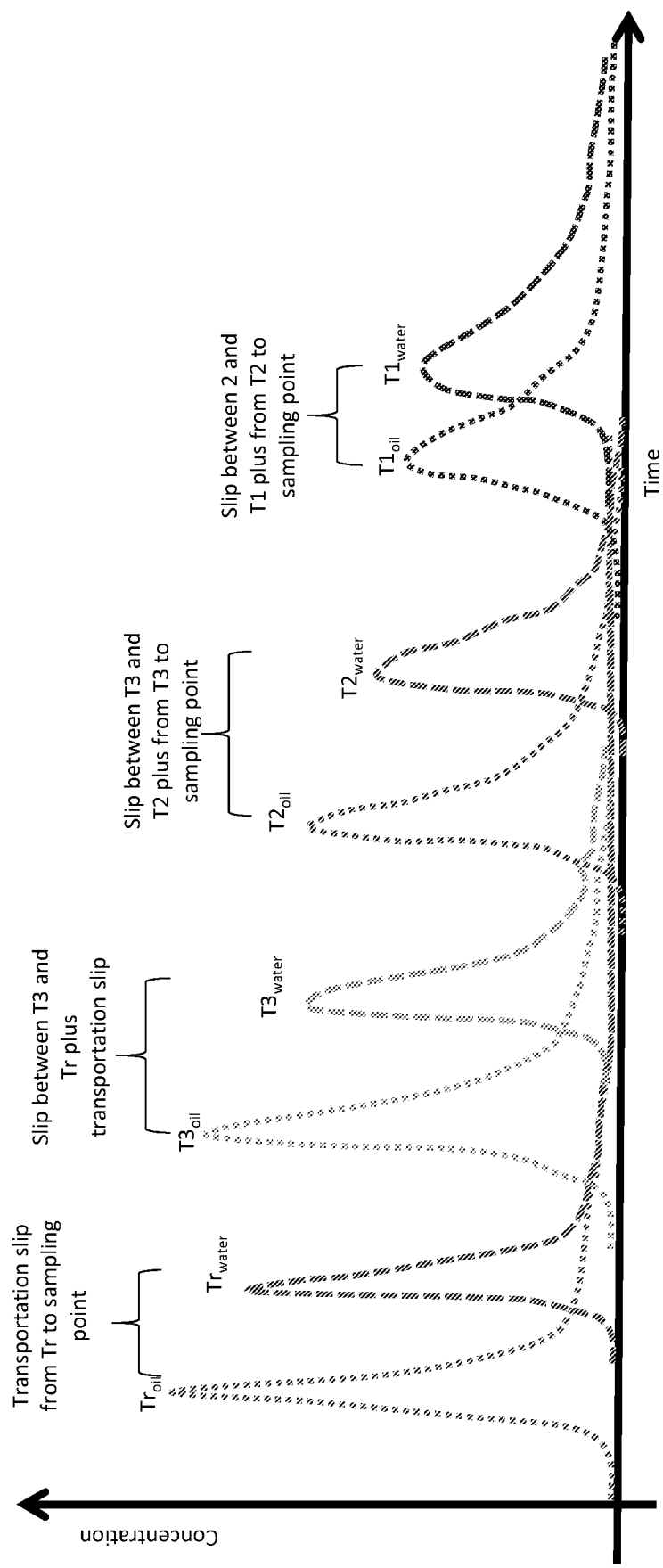

FIG. 4 shows example of monitored signal topside which shows typical characteristics of the dispersed tracer signal. There is a choice in selecting which feature of the peak to represent the arrival of each tracer signal. In principle, any part of the signal could be selected, as long as it is consistent for all peaks. The top of each peak could be selected to represent the average phase velocity or the leading edge could be selected to represent the arrival of the signal. In an alternative realization of the invention a sharp Dirac pulse in released downhole in a simulator and the shape of the arrival peak is reproduced in full accounting for the dispersion from injection point to detection point caused by both diffusion and convection. The difference between travel time of tracers installed in different locations is representative to inflow of the fluids between these two sequential tracer locations. The travel time difference between oil and water tracers injected from the same location is representative for the slip velocity.

All tracers flow a similar path and exposed to similar conditions in the upper completion, thus, this part of the tracer travel time may be removed from the total travel time of each tracer by reference injection at or near to the heel of the well. The rest of the delay is representative for the processes downhole. Based on the travel time, an inverse problem is solved aiming to reconstruct inflow profile and flow regimes in different sections of the pipe. This solution may be further improved if it is used as the initial guess for the multi-phase solver. The multi-phase solver is used for the fine tuning of the zonal inflow to match measured tracer signals (time series of concentration).

The knowledge of the downhole formation volume factors, geometry and the size of completion are essential. The exact location of the inflow port is useful as well. However, the uncertainty of the position of the inflow ports can be compensated by the higher time resolution of the signal. The reliability of the method can be improved if it is used together with the multiphase flow meters.

A procedure for the data extraction are as shown in FIG. 16. First peaks of the tracers are identified, and arrival times to the topside are calculated. Then the travel time between each tracer injection point is calculated. The tracer velocity is calculated by dividing the distance between each tracer location by the corresponding travel time. In a embodiment two tracer injection stations may be located 100 m apart, and their arrival times topside may indicate that the water tracer used 800 seconds and the oil tracer used 500 seconds to travel this distance. This will give an average water flow velocity of 100 meters/800 seconds=0.125 meters per second and an oil flow velocity of 100 meters/500 meters=0.2 meters per second. This gives an oil-water slip velocity=velocity oil–velocity water=0.2–0.125=0.075 meters per second. For a majority of fluid compositions found in oil fields these flow velocities indicate that for a close to horizontal wellbore the flow regime is here stratified with a smooth interface indicating a small dispersion layer.

In the case when the target phase of a certain tracer is not present at the location of injection, the tracer will be spread in the non-target phase in a mist of small distributed droplets that will travel with the main flow. The resulting lack of slip velocity, and similar dispersion profile, between oil tracer and water tracer will be used to interpret absence of the target phase for one of the tracers in the place of tracer injection. Determination of the phase on the place of tracer injection will be derived based on the hold-up downstream where the other phase will appear and the slip will be distinguishable. Please see FIG. 14 for details.

Next procedures are for each section of the well based on the measured velocities of each phase, discussion below is given for the flow of oil and water; however, similar procedures can be done for three phase flow using appropriate flow regime maps.

1) Oil and water velocities are used to evaluate the flow regime using experimentally or theoretically derived flow regime map. If there are several possible flow regimes for different water cuts for the given average velocity of each phases on the flow regime map, all these flow regimes should be tested in the next step and the one matching the fluid velocity of each phase will be the correct one. Example of the flow regime map for a horizontal flow of oil and water is given in 17.

For example, a stratified flow regime exists for the production rate of up to approximately 4000 bpd for horizontal sections of the well. Exact values of transition between different phases depend on the pipe diameter, inclination of the pipe and fluid properties, so for each section appropriate flow regime map should be used based on the hydraulic diameter of the cross-section and the section trajectory.

2) The hold-up of each phase should be calculated using appropriate equations for the given flow regime. For example, in the case of steady stratified flow, the hold-up is obtained from the following equation:

$$-\frac{\tau_w S_w}{A_w} + \frac{\tau_o S_o}{S_o} \pm \tau_i S_i \left( \frac{1}{A_w} + \frac{1}{A_o} \right) - (\rho_w - \rho_o)g\sin\gamma = 0$$

where $\tau_w$ is the shear stress on the water phase at the periphery of the pipe wetted by water ($S_w$); $\tau_o$ is the share stress on the oil phase at the periphery of the pipe wetted by oil ($S_o$); $S_i$ is the periphery of the oil-water interface, $A_w$ and $A_o$ are the water and oil hold-ups respectively; $\rho_w$ and $\rho_o$ are the densities of water and oil, g is the gravitation constant, $\gamma$ is the inclination angle of the well section. For illustration purposes let's consider the simplest case of very close to horizontal flow of two liquids. In this case, the equation is simpler as the last two terms are negligible compared to the first two ones and the relations between $S_w$ and $S_o$ and $A_w$ and $A_o$ comes from geometrical considerations:

$$-\frac{\tau_w S_w}{A_w} + \frac{\tau_o(\pi D - S_w)}{0.25\pi D^2 - A_w} = 0$$

where D is the diameter of the pipe. $S_w$ and $A_w$ are related geometrically. $\tau_w$ and $\tau_o$ can be calculated from the measured tracer travel velocity, hydraulic diameter for each phase and the friction factor obtained from the Moody chart or appropriate equations for the laminar and turbulent flow. In the case of horizontal flow two situations may exists in which either oil or water travels faster as shown in 15. The oil travels faster when the flow regime is turbulent for both phases because the wall friction is proportional to the density of the fluid. In the case of laminar flow, viscosity plays more important role and oil moves slower.

For other flow regimes calculations are similar, but with different appropriate equations which capture the main physics processes defining the flow of each phase. Such equations can be found in literature and calculations can be performed by anyone skilled in the art. For example, for the stratified flow with a thick dispersion layer, the same equations as for stratified flow can be used with satisfactory accuracy. As an alternative, commercially available softwares such as OLGA and LedaFlow will perform these calculations given the appropriate input values.

3) The flow rate in the section for each phase is the product of the velocity and the hold-up of this phase. Mathematically this is given as $q_i = A_i \cdot v_i$, where $q_i$ is the flow rate of phase i, $A_i$ is the hold-up of phase i and $v_i$ is the average phase velocity of phase i.

4) The inflow of each phase over each section is obtained based on the difference of the flow rates of each phase in the given section and the flow rates in the section upstream.

The described method is especially good for long horizontal pipes where the flow rate varies slowly along the well.

In the case of the dispersed flow in horizontal section of the well, the velocity of oil and water will be the same, and therefore, it is complicated to derive the flow rate for each phase based on the fluid velocities. However, in the case of the non-horizontal dispersed flow oil and water will have different velocities due to buoyancy force; and therefore, the value of the hold-up can be obtained. The flow rate of each phase for the given section of the well with dispersed flow can be estimate using: 1) as complete as possible information about the velocities and hold-up in this section derived from the travel time, 2) and the flow rate of each phase in the upstream section of the well where the flow rate of each phase is known, 3) pressure drop data if available.

When the procedures described above are completed. The accuracy of the calculated inflow profile along the well can be improved using multi-phase flow simulator. Values obtained in the previous steps can be used as the initial guess and more accurate inflow over each section can be obtained by tuning the model to match the measured signal topside including the complete signal which includes dispersion of tracers during the flow or any other effects.

Dispersion of the tracer signal can be used as additional input of the multi-phase flow simulator. Dispersion of the tracer signal is dependent on the flow regime (e.g., dispersed, segregated, annular) and on the Reynolds number of the flow of particular phase, and the behaviors of the phase boundary. The amplitude of the measured tracer concentration can be also use as additional input to the simulator, which would show dilution of each tracer in the corresponding phase.

Some Definitions

Fiber—is optical fiber or light guide which is used to transmit the light.

Receiver—any photodetector or spectrometer.

source—any source of light with narrow spectral band, created for example, by LED, laser diode, laser or a combination of such devices which would create combination of several narrow bands.

Tracer—any luminescent tracer, dye with narrow absorbance or quantum dots or any of the described above incorporated into particles. Example of suitable luminescent dye is Sulfo-Rhodamine B, absorbing dye is 2-[2-[2-Chloro-3-[2-(1,3-dihydro-1,3,3-trimethyl-2H-indol-2-ylidene)-ethylidene]-1-cyclohexen-1-yl]-ethenyl]-1,3,3-trimethyl-3H-indolium chloride, quantum dots can be few nm in size CdSe quantum dots. The particles for dye protection can be made of porous silica or any other material, particles can also have a core-shell structure.

The invention claimed is:

1. A method of multi-phase petroleum well flow characterisation comprising:

for at least two injection positions (Prinj, P1inj, P2inj, P3inj), along a well having a production zone (600) and a transport path (700) to surface, said well having a local production flow (Fr, F1, F2, F3) of target fluids water (w) and hydrocarbon fluids (h) (oil and/or gas) at each position, wherein at least one or more injection positions (P1inj, P2inj, P3inj) are along said production zone (600), and establishing a stable flow regime in the well, and including:

a) for at least two of said injection positions (Prinj, P1inj, P2inj, P3inj):

using locally arranged injection devices (Ir, I1, I2, I3);

injecting in a synchronized manner, at least one set of at least a water-affine and a hydrocarbon-affine tracer (Trw, Trh);

said tracers (Trw, Trh) being optically detectable;

using in said injection said water-affine and said hydrocarbon-affine tracer (Trw, Trh) having a property of partitioning less than 1:10 to its non-target fluid phase;

said injection occurring simultaneously into all said target fluids (w, h) present in said local production flow (Fr, F1, F2, F3); and one of said injections (Ir) placed as a reference injection (Ir) at said injection position (Prinj) being at or near above a downstream end of said production zone (600) to measure the transport times of the various phases to the online detection point (U) further downstream;

b) allowing transport of said production flow (Fr, F1, F2, F3) from said downhole injection positions (Prinj, P1inj, P2inj, P3inj) to an online detector (D) in the production flow (F) at a detection point (U) downstream of all said injection positions;

c) at said online detection point (U), conducting optical monitoring for detection of said tracers (Trw, Trh) in said production flow (F) to determine arrival times (trw, trh, t1w, t1h, t2w, t2h, t3w, t3h) of said tracers (Trw, Trh);

d) calculating detection point (U) slip times ($\Delta$twhr, $\Delta$twh1, $\Delta$twh2, $\Delta$twh3) between corresponding arrival times (trw, trh, t1w, t1h, t2w, t2h, t3w, t3h) of said water- and hydrocarbon tracers (Trw, Trh) as measured at said detection point (U);

e) back calculating said detection point (U) slip times ($\Delta$twhr, $\Delta$twh1, $\Delta$twh2, $\Delta$twh3) to transport slip times ($\Delta$tzwhr) and local zonal slip times ($\Delta$tzwh1, $\Delta$tzwh2, $\Delta$tzwh3); and f) based on said transport slip times (Δtzwhr) and local zonal slip times (Δtzwh1, Δtzwh2, Δtzwh3), characterizing the flow behaviour of the well, said characterization interpreting each zone into one or more flow regimes including:
segregated;
dispersed;
annular; and/or
slug flow.

2. The method according to claim 1, wherein using said tracers (Trw, Trh) being luminescent or have specific light absorbing characteristics.

3. The method according to claim 2, wherein said detection of the tracers (Trw, Trh) is conducted using backscattered fluorescence measurements.

4. The method according to claim 3, wherein during said optical monitoring measurement comprises:
emitting light (L1) from a light source (L) through an array of one or more windows (1) arranged across said flow (F), into said flow (F), whereby said light (L1) generates tracer-specific back-scattered luminescence (L2w, L2h) in said tracers (Trw, Trh) present in said flow (F);
collecting said backscattered light (L2w, L2h) entering ("returning") through said array of windows (1), and calculating light intensity values (LIw, LIh) of light (L2w, L2h) representing said tracers (Trw, Trh); and
recording said light intensity values (L2w, L2h).

5. The method of claim 4, further comprising defining said arrival times (tw, th) of each detected tracer (Trw, Trh) by defining a characteristic feature in the record/graph of said light intensity values (L2w, L2h).

6. The method of claim 1, further comprising using said water-affine and said hydrocarbon-affine tracer (Trw, Trh) having a property of partitioning less than 1:100 to its non-target fluid phase.

7. The method of claim 6, wherein said water-affine and said hydrocarbon-affine tracer (Trw, Trh) are injected by a common carrier fluid or a mixture of carrier fluids from a common chamber.

8. The method of claim 7, wherein using said set of at least a water-affine and said hydrocarbon-(oil and/or gas)-affine tracers (Trw, Trh) being different (unique) for at least two neighbour injection positions (Prinj, P1inj, P2inj, P3inj).

9. The method of claim 7, wherein while using said set of at least said water-affine and said hydrocarbon-(oil and/or gas)-affine tracers (Trw, Trh) also including a neutral tracer (Trn), said neutral tracer (Trn) to fractionate between the phases.

10. The method of claim 7, wherein using said set of at least a water-affine and said hydrocarbon-(oil and/or gas)-affine tracers (Trw, Trh) being identical for at least two injection positions (Prinj, P1inj, P2inj, P3inj).

11. The method of claim 10, wherein using said set of at least said water-affine and said hydrocarbon-(oil and/or gas)-affine tracers (Trw, Trh) being equal for all injection positions (Prinj, P1inj, P2inj, P3inj) in said well while separations between consecutive injection positions (Prinj, P1inj, P2inj, P3inj) are sufficient to assign top-side measurements to unique injection positions (Prinj, P1inj, P2inj, P3inj) downhole.

12. A multi-phase petroleum well flow characterisation system, comprising:
a petroleum well (600, 700) having a production pipe (4) with a production flow (F), said well having a production zone (600) and a transport path (700) downstream of said production zone (600), said production zone (600) conducting one or more local production flows (Fr, F1, F2, F3) in a stable flow regime; and
at least two injection positions (Pr, Pin, P2inj, P3inj) corresponding to said local production flows (Fr, F1, F2, F3) which comprise potential target fluids water (w) and hydrocarbon fluids (h) (oil and/or gas),
wherein each said injection position (Prinj, P1inj, P2inj, P3inj) has locally arranged corresponding injection devices (Ir, I1, I2, I3), each having a reservoir of least a water-affine and a hydrocarbon-affine tracer (Trw, Trh),
wherein each injection device is arranged for simultaneously injecting a set of said water-affine and the hydrocarbon-affine tracer (Trw, Trh),
wherein each said injection device is arranged for injecting said set of the water-affine and said hydrocarbon-affine tracer (Trw, Trh) into all said target fluids water and hydrocarbon (w, h) present in said local production flow (Fr, F1, F2, F3),
wherein said water-affine and said hydrocarbon-affine tracer (Trw, Trh) have the property of partitioning less than 1:10 to its non-target fluid phase,
wherein at least two of said injection devices (Ir, I1, I2, I3) is arranged for injecting, in a synchronized manner, said sets of the set of tracers (Trw, Trh),
wherein one of said injection devices (Ir) is arranged for reference injection at an injection position (Prinj) at or near above a downstream end of said production zone (600) to measure the transport times of the various phases to the online detection point (U) further downstream,
wherein an online optical detector (D) in the production flow (F) at a detection point (U) is arranged downstream along said transport path (700),
wherein said detector (D) is arranged for conducting optical detection of the tracers (Trw, Trh) in said production flow (F) to determine arrival times (trw, trh, t1w, t1h, t2w, t2h, t3w, t3h) of the tracers (Trw, Trh),
wherein a calculating device for calculating a slip time (Δtwhr, Δtwh1, Δtwh2, Δtwh3) between corresponding arrival times (trw, trh, t1w, t1h, t2w, t2h, t3w, t3h) of water- and hydrocarbon tracers (Trw, Trh) and the calculating device are arranged for back calculating slip times (Δtwhr, Δtwh1, Δtwh2, Δtwh3) to local zonal slip times (Δtzwhr, Δtzwh1, Δtzwh2, Δtzwh3), and
wherein the calculating device is arranged for, based in part on the local zonal slip times (Δtzwhr, Δtzwh1, Δtzwh2, Δtzwh3), interpreting each zone into one or more flow regimes or other characterization such as inflow distribution of the various phases produced.

13. The multi-phase petroleum well flow characterisation system of claim 12, said detection point (U) being topside.

14. The multi-phase petroleum well flow characterisation system of claim 12, wherein said detection point (U) is arranged just after a last influx point before said transport path (700).

15. The multi-phase petroleum well flow characterisation system of claim 12, wherein said optical detector (D) is arranged in an erosion probe access point.

16. The multi-phase petroleum well flow characterisation system according to claim 12, wherein said tracers (Trw, Trh) are luminescent or have specific light absorbing characteristics.

17. The multi-phase petroleum well flow characterisation system according to claim 12, wherein said timer clocks (108) are arranged for synchronization with a topside control device, wherein said timer clocks (108) are arranged for synchronization triggered by a synchronizing action such as pressure pulsing the well.

18. The multi-phase petroleum well flow characterisation system according to claim 12, wherein at least a pair of said injection devices (Ir, I1, I2, I3), each comprising a timer clock (108), are arranged for synchronization with each other.

19. The multi-phase petroleum well flow characterisation system according to claim 18, wherein said calculating device is arranged for defining said arrival times (tw, th) of each detected said tracer (Trw, Trh) by defining a first significant characteristic feature in a record/graph of said light intensity values (L2w, L2h).

20. The multi-phase petroleum well flow characterisation system of claim 12, wherein at least two local said production flows (Fr, F1, F2, F3), which comprise potential said target fluids of said water (w) and hydrocarbon fluids (h) (oil and/or gas), have corresponding said injection positions (Pr, Pin, P2inj, P3inj).

21. The multi-phase petroleum well flow characterisation system of claim 20, wherein said injection devices (Ir, I1, I2, I3) each are arranged at locally corresponding said injection positions (Prinj, P1inj, P2inj, P3inj).

22. The multi-phase petroleum well flow characterisation system of claim 12, wherein said water-affine and said hydrocarbon-affine tracer (Trw, Trh) have the property of partitioning less than 1:100 to its non-target fluid phase.

23. The multi-phase petroleum well flow characterisation system of claim 22, wherein said set of at least said water-affine and said hydrocarbon-(oil and/or gas)-affine tracers (Trw, Trh) also includes a neutral tracer (Trn), said neutral tracer (Trn) fractionating between phases.

24. The multi-phase petroleum well flow characterisation system of claim 22, wherein said set of at least said water-affine and said hydrocarbon-(oil and/or gas)-affine tracers (Trw, Trh) are different (unique) for at least two neighbour said injection positions (Prinj, P1inj, P2inj, P3inj).

25. The multi-phase petroleum well flow characterisation system of claim 22, wherein said sets of at least said water-affine and said hydrocarbon-(oil and/or gas)-affine tracers (Trw, Trh) are identical for at least two of said injection positions (Prinj, P1inj, P2inj, P3inj).

26. The multi-phase petroleum well flow characterisation system of claim 25, wherein said set of at least said water-affine and said hydrocarbon-(oil and/or gas)-affine tracers (Trw, Trh) are equal for all injection positions (Prinj, P1inj, P2inj, P3inj) in said well while separations between consecutive injection locations (Prinj, P1inj, P2inj, P3inj) are sufficient to assign top-side measurements to unique injection positions (Prinj, P1inj, P2inj, P3inj) downhole.

* * * * *